(12) United States Patent
Rosenberg

(10) Patent No.: US 7,061,467 B2
(45) Date of Patent: *Jun. 13, 2006

(54) FORCE FEEDBACK DEVICE WITH MICROPROCESSOR RECEIVING LOW LEVEL COMMANDS

(75) Inventor: Louis B. Rosenberg, Pleasanton, CA (US)

(73) Assignee: Immersion Corporation, San Jose, CA (US)

(*) Notice: Subject to any disclaimer, the term of this patent is extended or adjusted under 35 U.S.C. 154(b) by 196 days.

This patent is subject to a terminal disclaimer.

(21) Appl. No.: 09/974,198

(22) Filed: Oct. 9, 2001

(65) Prior Publication Data

US 2002/0033841 A1 Mar. 21, 2002

Related U.S. Application Data

(63) Continuation of application No. 09/057,997, filed on Apr. 9, 1998, now Pat. No. 6,300,937, which is a continuation of application No. 08/534,791, filed on Sep. 27, 1995, now Pat. No. 5,739,811, which is a continuation-in-part of application No. 08/489,068, filed on Jun. 9, 1995, now Pat. No. 5,721,566, and a continuation-in-part of application No. 08/461,170, filed on Jun. 6, 1995, now Pat. No. 5,576,727, which is a continuation of application No. 08/092,974, filed on Jul. 16, 1993, now abandoned.

(51) Int. Cl.
*G06F 3/033* (2006.01)

(52) U.S. Cl. ........................ 345/156; 345/157; 345/701
(58) Field of Classification Search ................. 345/156, 345/157, 161, 184, 701, 702; 463/30, 37, 463/38; 434/45

See application file for complete search history.

(56) References Cited

U.S. PATENT DOCUMENTS 2,906,179 A    9/1959 Bower (Continued)

FOREIGN PATENT DOCUMENTS

| EP | 0085518 | 8/1983 |
|---|---|---|
| EP | 0 349 086 A1 | 1/1990 |
| EP | 0626634 | 11/1994 |
| GB | 2254911 | 10/1992 |

(Continued)

OTHER PUBLICATIONS

R. L. Hollis, S. E. Salcudean, Lorentz Levitation Technology: A New Approach to Fine Motion Robotics, Teleoperation, Hapt Interfaces, and Vibration Isolation in International Symposium of Robotics Research (ISRR), Hidden Valley, PA., Oct. 1993.*

(Continued)

*Primary Examiner*—Jeffery Brier
(74) *Attorney, Agent, or Firm*—Thelen Reid & Priest LLP; David B. Ritchie

(57) ABSTRACT

A method and apparatus for controlling and providing force feedback using an interface device manipulated by a user. A microprocessor is provided local to the interface device and reads sensor data from sensors that describes the position and/or other information about an object grasped and moved by the user, such as a joystick. The microprocessor provides the sensor data to a host computer that is coupled to the interface device by a communication bus that preferably includes a serial interface. In a "host-controlled" embodiment, the host computer calculates force values using the sensor data and other parameters of a host application program and sends the force values to the local microprocessor, which directly provides the force values to actuators to apply forces to the user object. In a "reflex" embodiment, the host computer sends high level supervisory commands to the local microprocessor, and the microprocessor independently implements a local process based on the high level command for reading sensor data and providing force values to the actuators using sensor data and other parameters.

19 Claims, 12 Drawing Sheets

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,490,059 A | 1/1970 | Paulsen et al. |
| 3,497,668 A | 2/1970 | Hirsch |
| 3,517,446 A | 6/1970 | Corlyon et al. |
| 3,531,868 A | 10/1970 | Stevenson |
| 3,623,064 A | 11/1971 | Kagan |
| 3,795,150 A | 3/1974 | Eckhardt |
| 3,875,488 A | 4/1975 | Crocker et al. |
| 3,890,958 A | 6/1975 | Fister et al. |
| 3,902,687 A | 9/1975 | Hightower |
| 3,903,614 A | 9/1975 | Diamond et al. |
| 3,911,416 A | 10/1975 | Feder |
| 3,919,691 A | 11/1975 | Noll |
| 3,944,798 A | 3/1976 | Eaton |
| 4,125,800 A | 11/1978 | Jones |
| 4,127,752 A | 11/1978 | Lowthorp |
| 4,148,014 A | 4/1979 | Burson |
| 4,160,508 A | 7/1979 | Frosch et al. |
| 4,216,467 A | 8/1980 | Colston |
| 4,236,325 A | 12/1980 | Hall et al. |
| 4,262,549 A | 4/1981 | Schwellenbach |
| 4,333,070 A | 6/1982 | Barnes |
| 4,398,889 A | 8/1983 | Lam et al. |
| 4,436,188 A | 3/1984 | Hayashi |
| 4,448,083 A | 5/1984 | Hayashi |
| 4,464,117 A | 8/1984 | Foerst |
| 4,477,043 A | 10/1984 | Repperger |
| 4,477,973 A | 10/1984 | Davies |
| 4,484,191 A | 11/1984 | Vavra |
| 4,513,235 A | 4/1985 | Acklam et al. |
| 4,550,221 A | 10/1985 | Mabusth |
| 4,550,617 A | 11/1985 | Fraignier et al. |
| 4,560,983 A | 12/1985 | Williams |
| 4,571,834 A | 2/1986 | Fraser et al. |
| 4,581,491 A | 4/1986 | Boothroyd |
| 4,593,470 A | 6/1986 | Davies |
| 4,599,070 A | 7/1986 | Hladky et al. |
| 4,601,206 A | 7/1986 | Watson |
| 4,603,284 A | 7/1986 | Perzley |
| 4,604,016 A | 8/1986 | Joyce |
| 4,632,341 A | 12/1986 | Repperger et al. |
| 4,638,798 A | 1/1987 | Shelden et al. |
| 4,653,011 A | 3/1987 | Iwano |
| 4,654,648 A | 3/1987 | Herrington et al. |
| 4,670,851 A | 6/1987 | Murakami et al. |
| 4,676,002 A | 6/1987 | Slocum |
| 4,679,331 A | 7/1987 | Koontz |
| 4,688,983 A | 8/1987 | Lindbom |
| 4,689,449 A | 8/1987 | Rosen |
| 4,703,443 A | 10/1987 | Moriyasu |
| 4,704,909 A | 11/1987 | Grahn et al. |
| 4,706,294 A | 11/1987 | Ouchida et al. |
| 4,708,656 A | 11/1987 | de Vries et al. |
| 4,713,007 A | 12/1987 | Alban |
| 4,750,487 A | 6/1988 | Zanetti |
| 4,769,763 A | 9/1988 | Trieb et al. |
| 4,782,327 A | 11/1988 | Kley et al. |
| 4,787,051 A | 11/1988 | Olson |
| 4,791,934 A | 12/1988 | Brunnett |
| 4,794,392 A | 12/1988 | Selinko |
| 4,795,296 A | 1/1989 | Jau |
| 4,798,919 A | 1/1989 | Miessler et al. |
| 4,800,721 A | 1/1989 | Cemenska et al. |
| 4,803,413 A | 2/1989 | Kendig et al. |
| 4,811,608 A | 3/1989 | Hilton |
| 4,819,195 A | 4/1989 | Bell et al. |
| 4,839,838 A | 6/1989 | LaBiche et al. |
| 4,849,692 A | 7/1989 | Blood |
| 4,868,549 A | 9/1989 | Affinito et al. |
| 4,879,556 A | 11/1989 | Duimel |
| 4,885,565 A | 12/1989 | Embach |
| 4,888,877 A | 12/1989 | Enderle et al. |
| 4,891,764 A | 1/1990 | McIntosh |
| 4,891,889 A | 1/1990 | Tomelleri |
| 4,896,554 A | 1/1990 | Culver |
| 4,907,970 A | 3/1990 | Meenen, Jr. |
| 4,907,973 A | 3/1990 | Hon |
| 4,925,312 A | 5/1990 | Onaga et al. |
| 4,930,770 A | 6/1990 | Baker |
| 4,934,694 A | 6/1990 | McIntosh |
| 4,942,545 A | 7/1990 | Sapia |
| 4,945,305 A | 7/1990 | Blood |
| 4,945,501 A | 7/1990 | Bell et al. |
| 4,949,119 A | 8/1990 | Moncrief et al. |
| 4,961,038 A | 10/1990 | MacMinn |
| 4,961,138 A | 10/1990 | Gorniak |
| 4,961,267 A | 10/1990 | Herzog |
| 4,962,448 A | 10/1990 | DeMaio et al. |
| 4,962,591 A | 10/1990 | Zeller et al. |
| 4,982,504 A | 1/1991 | Soderberg et al. |
| 4,983,786 A | 1/1991 | Stevens et al. |
| 4,983,901 A | 1/1991 | Lehmer |
| 5,007,085 A | 4/1991 | Greanias et al. |
| 5,007,300 A | 4/1991 | Siva |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin et al. |
| 5,038,089 A | 8/1991 | Szakaly |
| 5,040,306 A | 8/1991 | McMurtry et al. |
| 5,044,956 A | 9/1991 | Behensky et al. |
| 5,050,608 A | 9/1991 | Watanabe et al. |
| 5,072,361 A | 12/1991 | Davis et al. |
| 5,076,517 A | 12/1991 | Ferranti et al. |
| 5,078,152 A | 1/1992 | Bond et al. |
| 5,088,046 A | 2/1992 | McMurtry et al. |
| 5,088,055 A | 2/1992 | Oyama |
| 5,095,303 A | 3/1992 | Clark et al. |
| 5,103,404 A | 4/1992 | McIntosh |
| 5,107,080 A | 4/1992 | Rosen |
| 5,116,051 A | 5/1992 | Moncrief et al. |
| 5,116,180 A | 5/1992 | Fung et al. |
| 5,126,948 A | 6/1992 | Mitchell et al. |
| 5,128,671 A | 7/1992 | Thomas, Jr. |
| 5,131,844 A | 7/1992 | Marinaccio et al. |
| 5,132,672 A | 7/1992 | Clark |
| 5,139,261 A | 8/1992 | Openiano |
| 5,142,506 A | 8/1992 | Edwards |
| 5,142,931 A | 9/1992 | Menahem |
| 5,143,505 A | 9/1992 | Burdea et al. |
| 5,146,566 A | 9/1992 | Hollis, Jr. et al. |
| 5,148,377 A | 9/1992 | McDonald |
| 5,165,897 A | 11/1992 | Johnson |
| 5,175,459 A | 12/1992 | Danial et al. |
| 5,178,012 A | 1/1993 | Culp |
| 5,181,181 A | 1/1993 | Glynn |
| 5,182,557 A | 1/1993 | Lang |
| 5,184,306 A | 2/1993 | Erdman et al. |
| 5,184,319 A | 2/1993 | Kramer |
| 5,185,561 A | 2/1993 | Good et al. |
| 5,186,629 A | 2/1993 | Rohen |
| 5,186,695 A | 2/1993 | Mangseth et al. |
| 5,187,874 A | 2/1993 | Takahashi et al. |
| 5,189,355 A | 2/1993 | Larkins et al. |
| 5,189,806 A | 3/1993 | McMurtry et al. |
| 5,193,963 A | 3/1993 | McAffee et al. |
| 5,197,003 A | 3/1993 | Moncrief et al. |
| 5,203,563 A | 4/1993 | Loper, III |
| 5,204,824 A | 4/1993 | Fujimaki |

| | | |
|---|---|---|
| 5,209,131 A | 5/1993 | Baxter |
| 5,212,473 A | 5/1993 | Louis |
| 5,220,260 A | 6/1993 | Schuler |
| 5,223,776 A | 6/1993 | Radke et al. |
| 5,228,356 A | 7/1993 | Chuang |
| 5,230,623 A | 7/1993 | Guthrie et al. |
| 5,240,417 A | 8/1993 | Smithson et al. |
| 5,243,266 A | 9/1993 | Kasagami et al. |
| 5,251,127 A | 10/1993 | Raab |
| 5,251,156 A | 10/1993 | Heier et al. |
| 5,259,120 A | 11/1993 | Chapman et al. |
| 5,259,894 A | 11/1993 | Sampson |
| 5,262,777 A | 11/1993 | Low et al. |
| 5,264,768 A | 11/1993 | Gregory et al. |
| 5,271,290 A | 12/1993 | Fischer |
| 5,275,174 A | 1/1994 | Cook |
| 5,275,565 A | 1/1994 | Moncrief |
| 5,283,970 A | 2/1994 | Aigner |
| 5,286,203 A | 2/1994 | Fuller et al. |
| 5,289,273 A | 2/1994 | Lang |
| 5,296,846 A | 3/1994 | Ledley |
| 5,296,871 A | 3/1994 | Paley |
| 5,299,810 A | 4/1994 | Pierce et al. |
| 5,309,140 A | 5/1994 | Everett, Jr. et al. |
| 5,334,027 A | 8/1994 | Wherlock |
| 5,351,692 A | 10/1994 | Dow et al. |
| 5,354,162 A | 10/1994 | Burdea et al. |
| 5,379,663 A | 1/1995 | Hara |
| 5,381,080 A | 1/1995 | Schnell et al. |
| 5,384,460 A | 1/1995 | Tseng |
| 5,389,865 A | 2/1995 | Jacobus et al. |
| 5,396,266 A | 3/1995 | Brimhall |
| 5,396,267 A | 3/1995 | Bouton |
| 5,397,323 A | 3/1995 | Tayor et al. |
| 5,402,582 A | 4/1995 | Raab |
| 5,405,152 A | 4/1995 | Katanics et al. |
| 5,412,880 A | 5/1995 | Raab |
| 5,414,337 A | 5/1995 | Schuler |
| 5,417,696 A | 5/1995 | Kashuba et al. |
| 5,428,748 A | 6/1995 | Davidson et al. |
| 5,429,140 A | 7/1995 | Burdea et al. |
| 5,436,542 A | 7/1995 | Petelin et al. |
| 5,436,622 A | 7/1995 | Gutman et al. |
| 5,436,640 A | 7/1995 | Reeves |
| 5,437,607 A | 8/1995 | Taylor |
| 5,445,166 A | 8/1995 | Taylor |
| 5,451,924 A | 9/1995 | Massimino et al. |
| 5,459,382 A | 10/1995 | Jacobus et al. |
| 5,466,213 A | 11/1995 | Hogan et al. |
| 5,467,763 A | 11/1995 | McMahon et al. |
| 5,482,051 A | 1/1996 | Reddy et al. |
| 5,512,919 A | 4/1996 | Araki |
| 5,513,100 A | 4/1996 | Parker et al. |
| 5,547,382 A | 8/1996 | Yamasaki et al. |
| 5,550,562 A | 8/1996 | Aoki et al. |
| 5,551,701 A | 9/1996 | Bouton et al. |
| 5,570,111 A | 10/1996 | Barrett et al. |
| 5,575,761 A | 11/1996 | Hajianpour |
| 5,576,727 A * | 11/1996 | Rosenberg et al. ......... 345/179 |
| 5,577,981 A | 11/1996 | Jarvik |
| 5,583,407 A | 12/1996 | Yamaguchi |
| 5,589,828 A | 12/1996 | Armstrong |
| 5,589,854 A | 12/1996 | Tsai |
| 5,591,924 A | 1/1997 | Hilton |
| 5,623,582 A | 4/1997 | Rosenberg |
| 5,625,576 A | 4/1997 | Massie et al. |
| 5,629,594 A | 5/1997 | Jacobus et al. |
| 5,634,794 A | 6/1997 | Hildreth et al. |
| 5,642,469 A | 6/1997 | Hannaford et al. |
| 5,643,087 A | 7/1997 | Marcus et al. |
| 5,656,901 A | 8/1997 | Kurita |
| 5,666,138 A | 9/1997 | Culver |
| 5,690,582 A | 11/1997 | Ulrich et al. |
| 5,701,140 A | 12/1997 | Rosenberg et al. |
| 5,709,219 A | 1/1998 | Chen et al. |
| 5,721,566 A | 2/1998 | Rosenberg |
| 5,724,068 A | 3/1998 | Sanchez et al. |
| 5,734,373 A | 3/1998 | Rosenberg et al. |
| 5,736,978 A | 4/1998 | Hasser et al. |
| 5,739,811 A * | 4/1998 | Rosenberg et al. ......... 345/161 |
| 5,742,278 A | 4/1998 | Chen et al. |
| 5,754,023 A | 5/1998 | Rosten et al. |
| 5,755,577 A | 5/1998 | Gillio |
| 5,766,016 A | 6/1998 | Sinclair et al. |
| 5,767,839 A | 6/1998 | Rosenberg |
| 5,769,640 A | 6/1998 | Jacobus et al. |
| 5,771,037 A | 6/1998 | Jackson |
| 5,781,172 A | 7/1998 | Engel et al. |
| 5,785,630 A | 7/1998 | Bobick et al. |
| 5,790,108 A * | 8/1998 | Salcudean et al. .......... 345/157 |
| 5,805,140 A | 9/1998 | Rosenberg et al. |
| 5,857,986 A | 1/1999 | Moriyasu |
| 5,880,714 A | 3/1999 | Rosenberg et al. |
| 5,889,670 A | 3/1999 | Schuler et al. |
| 5,889,672 A | 3/1999 | Schuler et al. |
| 5,897,437 A | 4/1999 | Nishiumi et al. |
| 5,959,613 A | 9/1999 | Rosenberg et al. |
| 6,001,014 A | 12/1999 | Ogata et al. |
| 6,004,134 A | 12/1999 | Marcus et al. |
| 6,005,551 A | 12/1999 | Osborne et al. |
| 6,057,828 A | 5/2000 | Rosenberg et al. |
| 6,104,158 A | 8/2000 | Jacobus et al. |
| 6,111,577 A | 8/2000 | Zilles et al. |
| 6,160,489 A | 12/2000 | Perry et al. |
| 6,300,937 B1 * | 10/2001 | Rosenberg .................. 345/156 |
| 6,422,941 B1 | 7/2002 | Thorner et al. |

FOREIGN PATENT DOCUMENTS

| | | |
|---|---|---|
| GB | 2254911 A | 10/1992 |
| JP | H2-185278 | 7/1990 |
| JP | H4-8381 | 1/1992 |
| JP | 4034610 A2 | 2/1992 |
| JP | 4-34610 | 5/1992 |
| JP | H5-192449 | 8/1993 |
| JP | H7-24147 | 1/1995 |
| WO | 95/02233 | 1/1995 |
| WO | WO 9502801 | 1/1995 |
| WO | WO 9520787 | 8/1995 |
| WO | WO 9520788 | 8/1995 |
| WO | WO 9532459 | 11/1995 |
| WO | WO 9616397 | 5/1996 |
| WO | WO 9622591 | 7/1996 |
| WO | WO 9642078 | 12/1996 |

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

Iwata, "Pen–based Haptic Virtual Environment," 0–7803–1/93 IEEE, pp. 287–292, 1993.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State–of–the–Art Technology Survey and Evaluation," *JPL Publication 85–11*, NASA–CR–175890; N85–28559, pp. 1–84, Mar. 1, 1985.

Jones et al., "A perceptual analysis of stiffness," ISSN 0014–4819 Springer International (Springer–Verlag); *Experimental Brain Research,* vol. 79, No. 1, pp. 150–156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation,* pp. 25–44, May 2, 1993.

Snow et al., "Model–X Force–Reflecting–Hand–Controller," NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990.

Tadros, "Control System Design for a Three Degree of Freedom Virtual Environment Simulator Using Motor/Brake Pair Actuators," *MIT Archive,* pp. 1–88, Feb. 1990, archived Aug. 13, 1990.

Caldwell et al., "Enhanced Tactile Feedback (Tele–Traction) Using a Multi–Functional Sensor System," 1050–4729/93, pp. 955–960, 1993.

Adelstein et al., "Design and Implementation of a Force Reflecting Manipulandum for Manual Control research," DSC–vol. 42, *Advances in Robotics,* pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, *Advanced in Robotics,* pp. 55–61, ASME 1992.

Russo, "Controlling Dissipative Magnetic Particle Brakes in Force Reflective Devices," DSC–vol. 42, *Advances in Robotics,* pp. 63–70, ASME 1992.

Kontarinis et al., "Display of High–Frequency Tactile Information to Teleoperators," *Telemanipulator Technology and Space Telerobotics,* Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," *Cooperative Intelligent Robotics in Space,* Rui J. deFigueiredo et al. Editor, Proc. SPIE vol. 1387, pp. 215–222, 1990.

Adelstein, "A Virtual Environment System For The Study of Human Arm Tremor," *Ph.D. Dissertation,* Dept. of Mechanical Engineering, MIT, Jun. 1989, archived Mar. 13, 1990.

Bejczy, "Sensors, Controls, and Man–Machine Interface for Advanced Teleoperation," *Science,* vol. 208, No. 4450, pp. 1327–1335, 1990.

Bejczy, et al., "Generalization of Bilateral Force–Reflecting Control of Manipulators," *Proceedings Of Fourth CISM–IT-FoMM,* Sep. 8–12, 1981.

McAffee, et al., "Teleoperator Subsystem/Telerobot Demonstrator: Force Reflecting Hand Controller Equipment Manual," JPL 1988, JPL D–5172.

Minsky, "Computational Haptics: The Sandpaper System for Synthesizing Texture for a Force–Feedback Display," *Ph.D. Dissertation,* MIT, Jun. 1995, archived Jul. 6, 1995.

Jacobsen et al., "High Performance, Dextrous Telerobotic Manipulator With Force Reflection," *Intervention/ROV '91 Conference & Exposition,* Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration,* Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire,* Mar. 10–11, 1988.

Howe, "A Force–Reflecting Teleoperated Hand System for the Study of Tactile Sensing in Precision Manipulation," *Proceedings of the 1992 IEEE International Conference on Robotics and Automation,* Nice, France, May 1992.

Eberhardt et al., "OMAR—A Haptic display for speech perception by deaf and deaf–blind individuals," *IEEE Virtual Reality Annual International Symposium,* Seattle, WA, Sep. 18–22, 1993.

Rabinowitz et al., "Multidimensional tactile displays: Identification of vibratory intensity, frequency, and contractor area," *Journal of The Acoustical Society of America,* vol. 82, No. 4, Oct. 1987.

Bejczy et al., "Kinesthetic Coupling Between Operator and Remote Manipulator," *International Computer Technology Conference, The American Society of Mechanical Engineers,* San Francisco, CA, Aug. 12–15, 1980.

Bejczy et al., "A Laboratory Breadboard System For Dual–Arm Teleoperation," *SOAR '89 Workshop, JSC,* Houston, TX, Jul. 25–27, 1989.

Ouhyoung et al., "A Low–Cost Force Feedback Joystick and Its Use in PC Video Games," *IEEE Transactions on Consumer Electronics,* vol. 41, No. 3, Aug. 1995.

Marcus, "Touch Feedback in Surgery," *Proceedings of Virtual Reality and Medicine The Cutting Edge,* Sep. 8–11, 1994.

Bejczy, et al., "Universal Computer Control System (UCCS) For Space Telerobots," CH2413–3/87/0000/318501.00 1987 IEEE, 1987.

Scannell, "Taking a Joystick Ride," Computer Currents, Boston Edition, vol. 9, No. 11, Nov. 1994.

"Component Maintenance Manual With Illustrated Parts List, Coaxial Control Shaker Part No. C–25502," Safe Flight Instrument Corporation, Revised 28 Jan. 2002 (3 pages).

"Technical Manual Overhaul Instructions With Parts Breakdown, Coaxial Control Shaker Part No. C–25502," Safe Flight Instrument Corporation, Revised 15 Jul. 1980 (23 pages).

Jacobsen, S.C. Et Al., "High Performance, High Dexterity, Force Reflective Teleoperator II," ANS Topical Meeting on Robotics & Remote Systems, Albuquerque, New Mexico Feb. 24–27, 1991, pp. 1–10.

Kotoku, Tetsuo Et Al., "Environment Modeling for the Interactive Display (EMID) Used in Telerobotic Systems," IEEE Nov. 3–5, 1991, pp. 99–1004.

Bejczy, Antal K., "The Phantom Robot: Predictive Displays for Teleoperation with Time Delay," IEEE 1990, pp. 546–550.

Buttolo, Pietro Et Al., "Pen–Based Force Display for Precision Manipulation in Virtual Environments," IEEE Mar. 1995, pp. 1–8.

Tan, Hong Z. Et Al., "Human Factors for the Design of Force–Reflecting Haptic Interfaces," Tan, Srinivasan, Eberman, & Chang, ASME WAM 1994, pp. 1–11.

Ellis, R.E. Et Al., "Design and Evaluation of a High–Performance Prototype Planar Haptic Interface," ASME Dec. 3, 1993, DSC–vol. 49, pp. 55–64.

Adelstein Bernard D. Et Al., "A High Performance Two Degree–of–Freedom Kinesthetic Interface," Massachusetts Institute of Technology 1992, pp. 108–112.

Colgate, J. Edward Et Al., Implementation of Stiff Virtual Walls in Force–Reflecting Interfaces, Sep. 22, 1993, pp. 1–9.

Iwata, Hiroo Et Al., Volume Haptization, IEEE 1993, pp. 16–18.

Fischer, Patrick Et Al., "Specification and Design of Input Devices for Teleoperation," 1990.

Burdea, Grigore Et Al., "Distributed Virtual Force Feedback," IEEE May 2, 1993, pp. 25–44.

Rosenberg, Louis B., "The Use of Virtual Fixtures as Perceptual Overlays to Enhance Operator Performance in Remote Environments," Air Force Material Command, Sep. 1992, pp. 1–42.

Rosenberg, Louis B., "The Use of Virtual Fixtures to Enhance Operator Performance in Time Delayed Teleoperation," Crew Systems Directorate Biodynamics and Biocommunications Division Write–Patterson, Air Force Material Command, Mar. 1993, pp. 1–45.

Rosenberg, Louis B., "Perceptual Design of a Virtual Rigid Surface Contact," Center for Design Research Stanford University, Air Force Material Command, Apr. 1993, pp. 1–42.

Rosenberg, Louis B. Et Al., "Perceptual Decomposition of Virtual Haptic Surfaces," IEEE, Oct. 1993.

Rosenberg, Louis B., "Virtual Fixtures as Tools to Enhance Operator Performance in Telepresence Environments," SPIE Telemanipulator Technology, 1993.

Rosenberg, Louis B., "Virtual Haptic Overlays Enhance Performance in Telepresence Tasks," SPIE 1994.

Burdea, Grigore Et Al., "Dextrous Telerobotics with Force Feedback–An Overview," Robotica 1991, vol. 9.

Yamakita, M. Et Al., Tele–Virtual Reality of Dynamic Mechanical Model, IEEE Jul. 7–10, 1992, pp. 1103–1110.

Adlestein, Bernard D. Et Al., "Design and Implementation of a Force Reflecting Manipulandum for Manual Control Research," 1992, pp. 1–24.

Ouh–Young, Ming Et Al., "Force Display Performs Better than Visual Display in a Simple 6–D Docking Task," IEEE 1989, pp. 1462–1466.

Hannaford, Blake Et Al., "Performance Evaluation of a Six–Axis Generalized Force–Reflecting Teleoperator," IEEE May/Jun. 1991, vol. 21, No. 3, pp. 620–633.

Kilpatrick, Paul Jerome, "The Use of A Kinesthetic Supplement in an Interactive Graphics System", Xerox University Microfilms, 1976.

Burdea, Grigore et al., "A Portable Dextrous Master with Force Feedback," Presence: Teleoperators and Virtual Environments, MIT Press, Jun. 1991.

Fisher, S.S. Et. Al., "Virtual Environment Display System," ACM Workshop on Interactive 3D Graphics, Oct. 23–24, 1986.

Kotoku, Tetsuo, "A Predictive Display with Force Feedback and its Application to Remote Manipulation System with Transmission Time Display," IEEE 1992, Jul. 7–10, 1992, pp. 239–246.

Russo, Massimo Andrea, "The Design and Implementation of a Three Degree–of–Freedom Force Output Joystick," Department of Mechanical Engineering, May 11, 1990, pp. 9–40 & 96 & 97.

Winey III, Calvin M., "Computer Simulated Visual and Tactile Feedback as an Aid to Manipulator and Vehicle Control", MIT, 1981.

Minsky, Margaret Et Al., "Feeling and Seeing: Issues in Force Display," ACM 1990, pp. 235–242.

Herndon, J.N. Et Al., "The State–of–the–Art Model M–2 Maintenance System," Proceedings of the 1984 National Topical Meeting on Robotics and Remote Handling in Hostile Environments, American Nuclear Society, pp. 59–65.

Batter, James J. Et Al., "Grope–1: A Computer Display to the Sense of Feel," pp. TA–4–188–TA–4–192.

Gotow, J.K., Et. Al., "Perception of Mechanical Properties at the Man–Machine Interface," IEEE 1987, pp. 688–689.

Atkinston, William D. Et Al., "Computing with Feeling," Comput. & Graphics, vol. 2, No. 2–E, pp. 97–103.

Ouh–Young, Ming Et Al., "Using a Manipulator for Force Display in Molecular Docking," IEEE 1988, pp. 1824–1929.

Wiker, Steven F. Et Al., "Development of Tactile Mice for Blind Access to Computers: Importance of Stimulation Locus, Object Size, and Vibrotactile Display Resolution," Proc. of the Human Factors Society 35th Annual Meeting, 1991, pp. 708–712.

Adachi, Yoshitaka, Et Al., "Sensory Evaluation of Virtual Haptic Push–Buttons," Technical Research Center, Suzuki Motor Corporation, Nov. 1994.

Su, S. Augustine Et Al., "The Virtual Panel Architecture: A 3D Gesture Framework," IEEE 1993, pp. 387–393.

Schmult, Brian Et Al., "Application Areas for a Force–Feedback Joystick," ASME 1993, DSC–vol. 49, pp. 47–54.

Howe, Robert D., "Task Performance with a Dextrous Teleoperated Hand System," Proceedings of SPIE, Nov. 1992, vol. 1833, pp. 1–9.

Tan, Hong Z Et Al., "Manual Resolution of Compliance When Work and Force Cues are Minimized," ASME 1993, DSC–vol. 49, pp. 99–104.

Ouh–Young et al., "Creating an Illusion of Feel: Control Issues in Force Display," University of N. Carolina, 1989, pp. 1–14.

Millman Et Al., "Design of a Four–Degree–Of–Freedom Force–Reflecting Manipulandum with a Specified Force/Torque Workspace," IEEE CH2969–4, 1991, pp. 1488–1493.

Hiroo Iwata, "Artificial Reality with Force–feedback: Development of Desktop Virtual Space with Compact Master Manipulator," Computer Graphics, vol. 24, No. 4, 1990, pp. 165–170.

Brooks, Jr. Et Al., "Project Grope–Haptic Displays for Scientific Visualization," Computer Graphics, vol. 24, No. 4, 1990, pp. 177–185.

Hannaford Et Al., "Force–Feedback Cursor Control," NASA Tech Brief, vol. 13, No. 11, 1989, pp. 1–4.

Akamatsu Et Al., "Multimodal Mouse: A Mouse–Type Device with Tactile and Force Display," Presence, vol. 3, No. 1, 1994, pp. 73–80.

Hirota, Development of Surface Display, IEEE 0–7803–1363–1, 1993, pp. 256–262.

Kelley Et Al., "MagicMouse: Tactile and Kinesthetic Feedback in the Human–Computer Interface Using an Electromagnetically Actuated Input/Output Device," University of British Columbia, 1993, pp. 1–27.

Kelley Et Al., "On the Development of a Force–Feedback Mouse and Its Integration into a Graphical User Interface," Symp. on Haptic Interfaces for Virtual Environment and Teleoperator Systems, 1994, pp. 1–8.

"3D Human Interface Tool, Immersion Probe™", Immersion Human Interface Corporation 1994.

Iwata, Hiroo, "Pen–based Haptic Virtual Environment," Institute of Engineering Mechanics, University of Tsukuba, Japan, pp. 287–292.

McAffee, Douglas A., "Teleoperator System/Telerobot Demonstrator: Force Reflecting Hand Controller Equipment Manual," JPL Jan. 1988, pp. 3–8, 11, and A–34.

Snow, E. Et Al., "Compact Force–Reflecting Hand Controller," JPL, Apr. 1991, vol. 15, No. 3, Item No. 153, pp. 1–15a.

Jones, L.A. Et Al., "A Perceptual Analysis of Stiffness," Experimental Brain Research 1990, pp. 151–156.

Hasser, Christopher John, "Tactile Feedback for a Force–Reflecting Haptic Display," The School of Engineering, University of Dayton, Dec. 1995, pp. iii–xii & 1–96.

"Proceedings of the IFIP Congress 65," International Federation for Information Processing Information Processing 1965, vol. 3, New York, May 24–29, 1965, p. 506.

Noll, A. Michael, "Man–Machine Tactile Communication Dissertation," Polytechnic Institute of Brooklyn, Jun. 1971, pp. 1–88.

Ouh–Young, Ming, "Force Display in Molecular Docking," Chapel Hill 1990, pp. 1–85.

Krueger, Myron W., Artificial Reality 1988, pp. 54–75.

Immersion Probe–MD™, 3D Human Interface Interface Tool, Immersion Human Interface Corporation 1993.

"Call It Palpable Progress," Business Week, Oct. 9, 1995, pp. 93 & 96.

Burdea, Grigore et al., "A Portable Dextrous Master with Force Feedback," The State University of New Jersey, Jun. 1991.

Tavkhelidze, D.S. "Kinematic Analysis of Five–Link Spherical Mechanisms," Mechanism and Machine Theory 1974, vol. 9, pp. 181–190.

Meyer, Kenneth Et Al., "A Survey of Position Trackers," Presence 1992, vol. 2, pp. 173–200.

"Foot–Operated Mouse," IBM Technical Disclosure Bulletin, Apr. 1986, vol. 28, No. 11, p. 4763.

Immersion Probe 3D™, High Performance Model of the Immersion Probe.

"Designer's Corner," Design News, Mar. 7, 1994, p. 63.

Reperger, D.W., "Active Force Reflection Devices in Teleoperation", IEEE Control Systems, 1991, pp. 52–56.

Rosenberg, Louis B., "The Use of Virtual Fixtures as Perceptual Overlays to Enhance Operator Performance in Remote Environments," Air Force Material Command, Sep. 1992, pp. 1–42.

"The Personal Digitizer™," Immersion Human Interface Corporation, 1994.

Kim, Won S. Et Al., "Graphics Displays for Operator Aid in Telemanipulation," IEEE 1991, pp. 1059–1067.

Kim, Won S. Et Al., A Teleoperation Training Simulator with Visual and Kinesthetic Force Virtual Reality.

"Useful Technology for Your Idea File," Design News, Mar. 7, 1994, p. 63.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force–Feedback Touch–Introducing Actuator For Teleoperator Robot Control," *Bachelor of Science Thesis,* MIT, May 1983, archived Jun. 23, 1983.

Wiker, "Teletouch Display Development Phase 1 Report," *Technical Report 1230*, Naval Ocean Systems Center, San Diego Jul. 1988.

Bliss, "Optical–to–Tactile Image Conversion for the Blind," *IEEE Transactions on Man–Machine Systems*, vol. MMS–11, No. 1, Mar. 1970.

Johnson, "Shape–Memory Alloy Tactile Feedback Actuator," *Armstrong Aerospace Medical Research Laboratory*, AAMRL–TR–90–039, Aug., 1990.

Kongarinis et al., "Tactile Display of Vibratory Information in Teleoperation and Virtual Environments," PRESENCE, 4(4):387–402, Harvard Univ., 1995.

Aukstakalnis et al., "Silicon Mirage: The Art and Science of Virtual Reality," ISBN 0–938151–82–7, pp. 129–180, 1992.

Eberhardt et al., "Inducing Dynamic Haptic Perception by The Hand: System Description and Some Results," DSC–vol. 55–1, *Dynamic Systems and Control* vol. 1, ASME 1994.

Gobel et al., "Tactile Feedback Applied to Computer Mice," *International Journal of Human–Computer Interaction*, vol. 7, No. 1, pp. 1–24, 1995.

Pimentel et al., "Virutual Reality through the new looking glass," $2^{nd}$ Edition; McGraw–Hill, ISBN 0–07–050167–X, pp. 41–202, 1994.

"Cyberman Technical Specification," *Logitech Cyberman SWIFT Supplemental to Logitech Mouse Technical Reference and Programming Guide*, Apr. 5, 1994.

Ouhyoung et al., "The Development of A Low–Cost Force Feedback Joystick and Its Use in the Virtual Reality Environment," *Proceedings of the Third Pacific Conference on Computer Graphics and Applications*, Pacific Graphics '95, Seoul, Korea, Aug. 21–24, 1995.

Kaczmarek et al., "Tactile Displays," *Virtual Environmental Technologies*, Chap. 9, pp. 349–414.

Lake, "Cyberman from Logitech", at http://www.ibiblio.org/GameBytes/issues21/greviews/cyberman.html.

Yamakita et al., "Tele–Virtual Reality of Dynamic Mechanical Model," *Proceedings of the 1992 IEEE/RSJ International Conference on Intelligent Robots and Systems*, Raleigh, NC Jul. 7–10, 1992.

Noll, "Man–Machine Tactile," *SID Journal*, Jul./Aug. 1972 Issue.

Rosenberg, "Virtual Fixtures: Perceptual Overlays Enhance Operator Performance in Telepresence Tasks," Ph.D. *Dissertation*, Stanford University, Jun. 1994.

\* cited by examiner

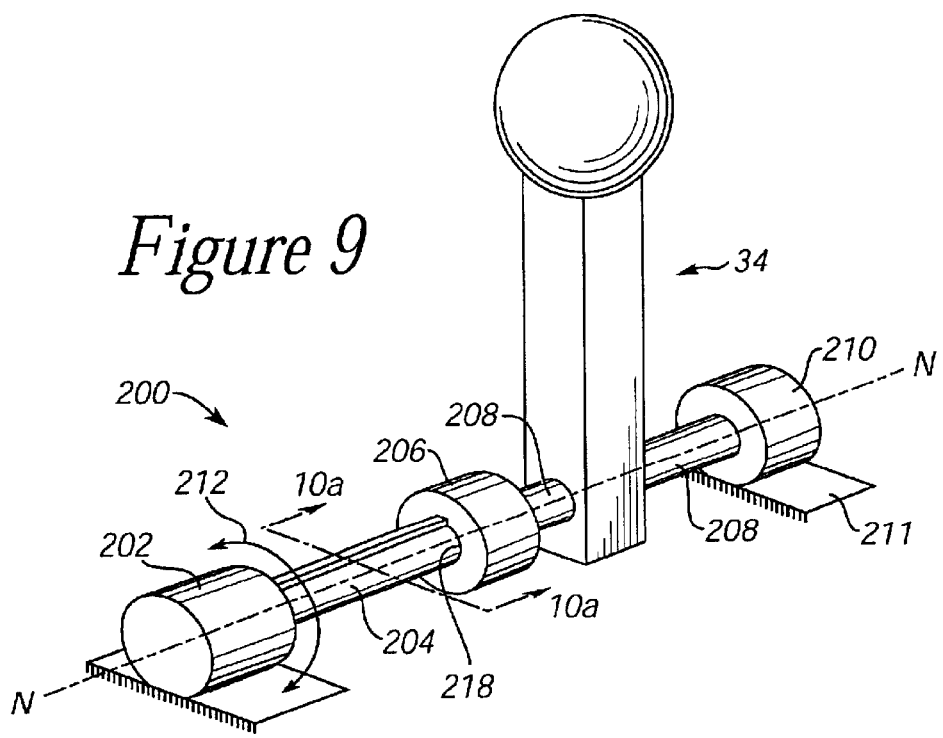
*Figure 9*
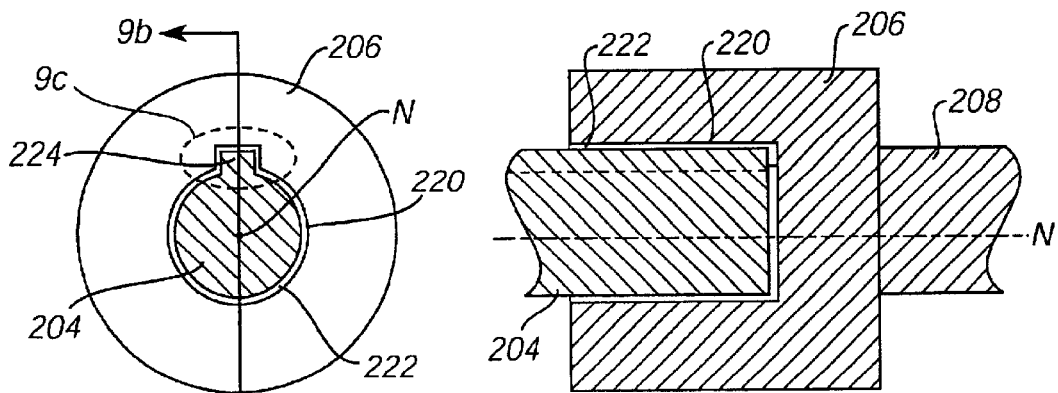
*Figure 9a*
*Figure 9b*
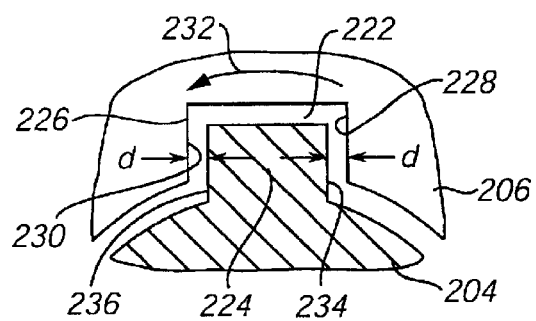
*Figure 9c*

FORCE FEEDBACK DEVICE WITH MICROPROCESSOR RECEIVING LOW LEVEL COMMANDS

CROSS REFERENCE TO RELATED APPLICATIONS

This application is a continuation of U.S. application Ser. No. 09/057,997, filed Apr. 9, 1998 now U.S. Pat. No. 6,300,937 which is a continuation of U.S. application Ser. No. 08/534,791, now U.S. Pat. No. 5,739,811, filed Sep. 27, 1995, which is 1) a continuation-in-part of application Ser. No. 08/489,068, now U.S. Pat. No. 5,721,566, filed Jun. 9, 1995, and 2) a continuation-in-part of application Ser. No. 08/461,170, now U.S. Pat. No. 5,576,727, filed June 6, 1995 which is a file wrapper continuation of application Ser. No. 08/092,974, filed July 16, 1993, now Abn. and all of which are incorporated herein by reference in their entireties.

BACKGROUND OF THE INVENTION

The present invention relates generally to interface devices between humans and computers, and more particularly to computer interface devices that provide force feedback to the user.

Computer systems are used extensively in many different industries to implement computer controlled simulations, games, and other application programs. More particularly, these types of games and simulations are very popular with the mass market of home consumers. A computer system typically displays a visual environment to a user on a display screen or other visual output device. Users can interact with the displayed environment to play a game, experience a simulation or "virtual reality" environment, or otherwise influence events or images depicted on the screen. Such user interaction can be implemented through the use of a human-computer interface device, such as a joystick, "joypad" button controller, mouse, trackball, stylus and tablet, or the like, that is connected to the computer system controlling the displayed environment. The computer updates the simulation or game in response to the user's manipulation of an object such as a joystick handle or mouse, and provides feedback to the user utilizing the display screen and, typically, audio speakers.

In some interface devices, tactile ("haptic") feedback is also provided to the user, more generally known as "force feedback." These types of interface devices can provide physical sensations to the user manipulating the object of the interface device. Typically, motors or other actuators are coupled to the object and are connected to the controlling computer system. The computer system can provide forces on the object in conjunction with simulation/game events by sending control signals to the actuators. The computer system can thus convey physical sensations to the user in conjunction with other supplied feedback as the user is grasping or contacting the object of the interface device. Force feedback interface devices can thus provide a whole new modality for human-computer interaction.

Force feedback input/output (I/O) devices of the prior art have concentrated on providing maximum haptic fidelity, i.e., the realism of the tactile feedback was desired to be optimized. This is because most of the force feedback devices have been targeted at the specific needs of highly industrial applications, and not a mass consumer market. To attain such realism, mass market design concerns such as low size and weight, low complexity, programming compatibility, low cost, and safety have been sacrificed in the prior art. As a result, typical force feedback interface devices include complex robotic mechanisms which require precision components and expensive actuators.

An important concern for a force feedback interface device is communication bandwidth between the controlling computer and the interface device. To provide realistic force feedback, the complex devices of the prior art typically use high speed communication electronics that allow the controlling computer to quickly update force feedback signals to the interface device. The more quickly the controlling computer can send and receive signals to and from the interface device, the more accurately and realistically the desired forces can be applied on the interface object. In addition, using a high bandwidth communication interface, force feedback can be accurately coordinated with other supplied feedback, such as images on the video screen, and with user inputs such as movement of the object, activated buttons, etc. For example, a user can grasp and move a force feedback joystick in a simulation to control an image of a car to drive over a virtual bumpy surface displayed on a screen. The controlling computer should provide control signals to the actuators of the joystick quickly enough so that the surface feels as realistically bumpy as the designer of the simulation intended. If the control signals are too slow, a realistic feeling of bumpiness is more difficult to provide. Also, the controlling computer needs a high bandwidth communication interface to accurately coordinate the supplied forces with the visual feedback on the screen, such as the moment on the screen when the car first contacts the bumpy surface. This high speed is likewise needed to accurately coordinate supplied forces with any input from the user, for example, to steer the car in particular directions.

A problem is evident when prior art force feedback interface devices are provided to the mass consumer market. Most home computers have a built-in standard serial communication interfaces, such as an RS-232 or RS-422 interface, that may conveniently be used to connect peripherals like a force feedback interface device to the host computer. In addition, manufacturers prefer to provide peripheral devices that use these serial interfaces, since no additional hardware, such as interface cards, need to be provided with such peripherals. The manufacturing cost of the peripheral device can thus be significantly reduced. However, these standard serial communication interfaces are typically quite slow (i.e. have low bandwidth) compared to other communicaton interfaces. Realistic and accurate force feedback thus becomes difficult to provide by a controlling computer system to a prior art interface device connected through such a serial interface. For example, U.S. Pat. No. 5,184,319, by J. Kramer, describes a force feedback device that applies forces to a user's body parts. However, the Kramer device is typical of the prior art in that the host computer directly controls the actuators and directly receives the sensor data from the interface apparatus. Such a device is not suitable for a low bandwidth communication interface to achieve realistic force feedback.

Another problem with using prior art force feedback interface devices in the mass consumer market is the wide variety of computer platforms and processing speeds that are used on different computers and on the same computer at different times. The force sensations provided to a user by a force feedback interface device may feel different to a user on different computer platforms or microprocessors, since these different computers run at different speeds. For example, the force feedback controlled by a 100 MHz computer may be much different from the force feedback controlled by a 60 MHz computer due to the different rates of processing control signals, even though these forces are intended to feel the same. In addition, the effective processing speed of one microprocessor can vary over time to provide inconsistent forces over multiple user sessions. For example, multitasking can vary or delay a microprocessor's management of force feedback control signals depending on other programs that are running on the microprocessor.

Therefore, a more realistic and accurate alternative to force feedback interface devices is desired for certain applications.

SUMMARY OF THE INVENTION

The present invention is directed to controlling and providing force feedback to a user operating a human/computer interface device. The interface device is connected to a controlling host computer and includes a separate microprocessor local to the interface device. The local microprocessor allows high-speed control of forces to the interface device, thus increasing the realism and accuracy of provided forces over a slow communication interface with the host computer.

More particularly, a system of the present invention for controlling an electromechanical interface apparatus manipulated by a user includes a host computer system for receiving an input control signal and for providing a host output control signal. The host computer updates an application process, such as a simulation or video game process, in response to the input control signal. A processor local to the interface apparatus and separate from the host computer receives the host output control signal and provides a processor output control signal. An actuator receives the processor output control signal and provides a force along a degree of freedom to a user-manipulated object coupled to the actuator in accordance with the processor output control signal. A sensor detects motion of the object along the degree of freedom and outputs the input control signal including information representative of the position and motion of said object. Preferably, the sensor outputs the input control signal to the local processor, which outputs the input control signal to the host computer.

In one host-controlled embodiment, the host computer receives the sensor information in the input control signal and determines the values of the forces. The host output control signal thus is the determined direct force command or force value that is relayed to the processor, and from the processor directly to the actuator. In a second, "reflex" embodiment, the host computer receives the sensor information in a supervisory mode and outputs a high level force command whenever a force is required to be applied to the user object or changed. The processor reads sensor information and outputs low level force commands or values to the actuator according to a subroutine or low-level process that is selected in accordance with the high level force command. The subroutine can include force equations or a force profile of predetermined force values. The processor thus implements a "reflex" to control forces independently of the host computer until the host computer changes the type of force applied to the user object.

The process updated by the host computer system preferably includes application software that can be simulation software, game software, scientific software, etc. The host computer system displays images on a visual output device such as a display screen and synchronizes the images and visual events with the position and motion input from the user manipulating the object as well as forces applied to the object. The host computer also preferably synchronizes the timing and magnitude of audio feedback with force feedback. The present invention can use a standard serial interface included on many computers to interface the host computer system with the local microprocessor. Alternatively, a parallel interface can be used, or a serial interface used in conjunction with a different interface on the host computer, such as a game port. A clock is preferably coupled to the host computer system or the local processor which can be accessed to determine, in part, the force output by the actuator.

The object is preferably grasped and moved by the user, and can include such articles as a joystick, mouse, steering wheel, medical instrument, or other object. The object can preferably be moved in one, two, or three degrees of freedom using, for example, a gimbal or slotted yoke mechanism, wherein an actuator and sensor can be provided for each degree of freedom. The actuator can be active or passive; for example, active actuators can include motors, pneumatic/hydraulic actuators, torquers, voice coils, etc. Passive actuators can include brakes, fluid controller dampers, etc.

A method for controlling an force feedback interface device manipulated by a user is similar to the apparatus described above, and includes a step of inputting a position signal to the host computer system from the sensor. The position signal includes information representative of the position and motion of the object of the interface device grasped by the user. A host force command is output from the host computer system to the local processors and a processor force command is output from the processor to the actuator. A force from the actuator is provided to the object grasped by the user, wherein a direction and a magnitude of the force is in accordance with the processor force command. The position signal is preferably input to the processor and is input to the host computer system from the processor. Both a host-command embodiment and a reflex embodiment are provided. A magnitude of the force provided by the actuator is determined by the host computer or the local processor. This magnitude can be determined from parameters including the position of the object along provided degrees of freedom, the velocity of the object moving along the degree of freedom, and/or the acceleration of the object moving along the degree of freedom. The force can thus simulate different types of forces such as a spring force, damping force, or inertia force. In addition, the modulation of the force can be determined, in part, from a clock that provides timing information for the force commands.

The control system of the present invention includes a separate processor local to the interface device that is separate from the host computer system. The local processor can read and process sensor signals as well as output force command signals independently of the host computer, thus saving significant processing time on the host computer. In addition, the use of the local processor to handle low-level force feedback commands allows more realistic and accurate force feedback to be provided to an object manipulated by a user when using a serial or other relatively low-bandwidth interface, since such low level force signals do not have to be transmitted over the interface. In addition, the use of a clock when generating force feedback commands in view of absolute timing information allows force sensations to be consistently experienced by users across different host computer platforms and at different sessions on the same host computer. These improvements allow a computer system to provide accurate and realistic force feedback over a low-cost, low bandwidth interface and is thus ideal for the mass market of home computer systems.

These and other advantages of the present invention will become apparent to those skilled in the art upon a reading of the following specification of the invention and a study of the several figures of the drawing.

BRIEF DESCRIPTION OF THE DRAWINGS

FIG. 9 is a schematic view of a transducer system including passive actuators and a play mechanism and providing a rotary degree of freedom to the user object;

FIG. 9a is a sectional side view of an actuator shaft and a play mechanism of the transducer system of FIG. 9;

FIG. 9b is a sectional side view of the actuator shaft and play mechanism of FIG. 9a;

FIG. 9c is a detailed view of keyed portions of the actuator shaft and play mechanism of FIG. 9a;

DETAILED DESCRIPTION OF PREFERRED EMBODIMENTS

Figure 1:
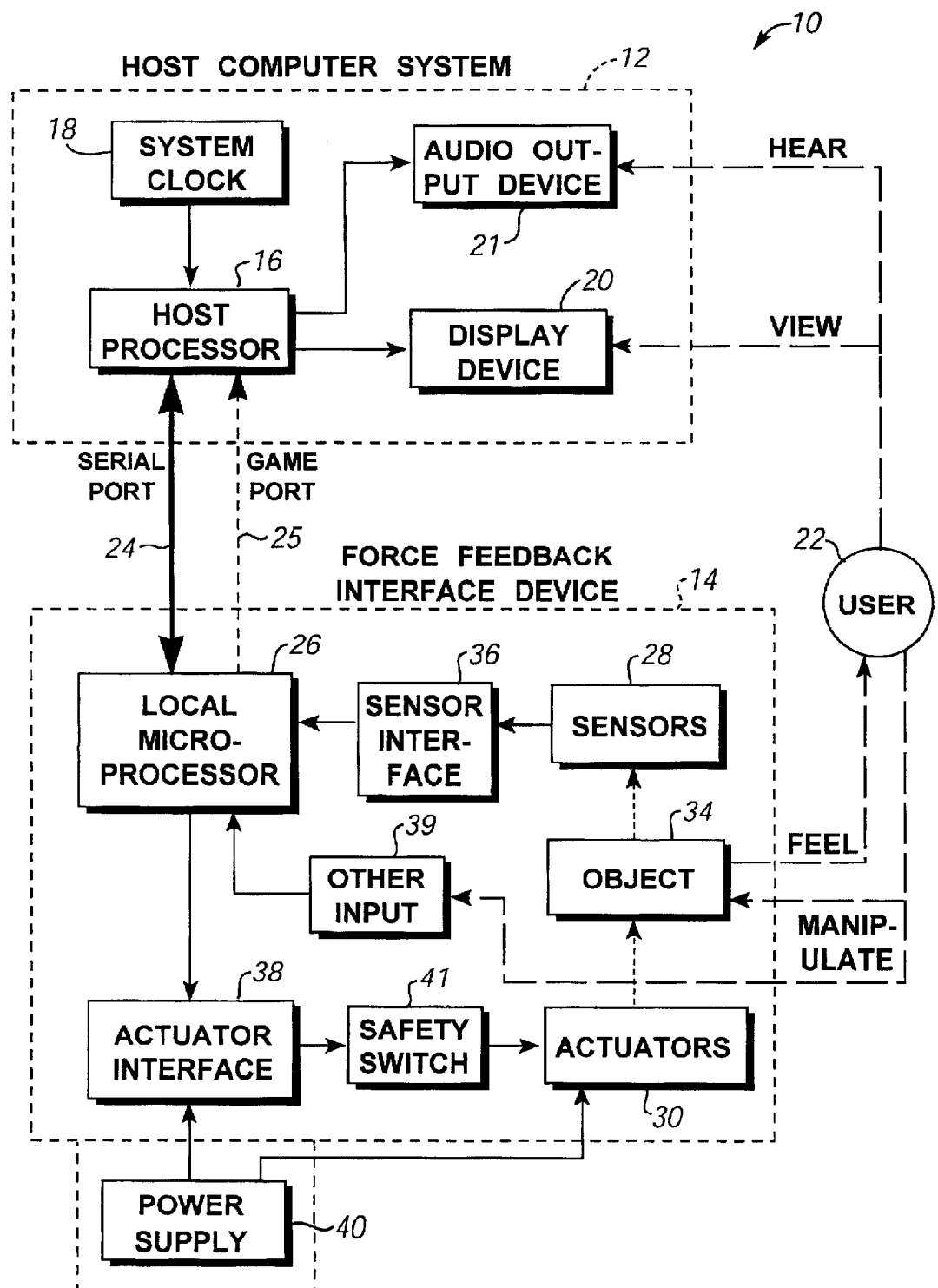
FIG. 1 is a block diagram of a control system in accordance with the present invention for controlling a force feedback interface device from a host computer.

FIG. 1 is a block diagram illustrating a generic control system 10 of the present invention for an interface device controlled by a host computer system. Control system 10 includes a host computer system 12 and an interface device 14.

Host computer system 12 is preferably a personal computer, such as an IBM-compatible or Macintosh personal computer, or a workstation, such as a SUN or Silicon Graphics workstation. Most commonly, the host computer system is a personal computer which operates under the MS-DOS or Windows operating systems in conformance with an IBM PC AT standard. Alternatively, host computer system 12 can be one of a variety of home video game systems commonly connected to a television set, such as systems available from Nintendo, Sega, or Sony. In other embodiments, home computer system 12 can be a "set top box" which can be used, for example, to provide interactive television functions to users.

In the described embodiment, host computer system 12 implements a host application program with which a user 22 is interacting via peripherals and interface device 14. For example, the host application program can be a video game, medical simulation, scientific analysis program, or even an operating system or other application program that utilizes force feedback. Typically, the host application provides images to be displayed on a display output device, as described below, and/or other feedback, such as auditory signals.

Host computer system 12 preferably includes a host microprocessor 16, a clock 18, and a display screen 20. Host microprocessor 16 can include a variety of available microprocessors from Intel, Motorola, or other manufacturers. Microprocessor 16 can be single microprocessor chip, or can include multiple primary and/or co-processors. In addition, host computer 12 preferably includes standard components such as random access memory (RAM), read-only memory (ROM), and input/output (I/O) electronics (not shown). In the described embodiment, host computer system 12 can receive sensor data or a sensor signal via a bus 24 from sensors of interface device 14 and other information. Host computer system 12 can also output a "force command" to interface device 14 via bus 24 to cause force feedback for the interface device.

Clock 18 is a standard clock crystal or equivalent component used by host computer system 12 to provide timing to electrical signals used by microprocessor 16 and other components of the computer system. Clock 18 is accessed by host computer system 12 in the control process of the present invention, as described subsequently.

Display screen 20 is coupled to host microprocessor 16 by suitable display drivers and can be used to display images generated by host computer system 12 or other computer systems. Display screen 20 can be a standard display screen or CRT, 3-D goggles, or any other visual interface. In a described embodiment, display screen 20 displays images of a simulation or game environment. In other embodiments, other images can be displayed. For example, images describing a point of view from a first-person perspective can be displayed, as in a virtual reality simulation or game. Or, images describing a third-person perspective of objects, backgrounds, etc. can be displayed. A user 22 of the host computer 12 and interface device 14 can receive visual feedback by viewing display screen 20.

Audio output device 21, such as speakers, is preferably coupled to host microprocessor 16 via amplifiers, filters, and other circuitry well known to those skilled in the art. Host processor outputs signals to speakers 21 to provide sound output to user 22 when a "audio event" occurs during the implementation of the host application program. Other types of peripherals can also be coupled to host processor 16, such as storage devices (hard disk drive, CD ROM drive, floppy disk drive, etc.), printers, and other input and output devices.

An interface device 14 is coupled to host computer system 12 by a bi-directional bus 24. The bi-directional bus sends signals in either direction between host computer system 12 and the interface device. Herein, the term "bus" is intended to generically refer to an interface such as between host computer 12 and microprocessor 26 which typically includes one or more connecting wires or other connections and that can be implemented in a variety of ways, as described below. In the preferred embodiment, bus 24 is a serial interface bus providing data according to a serial communication protocol. An interface port of host computer system 12, such as an RS232 serial interface port, connects bus 24 to host computer system 12. Other standard serial communication protocols can also be used in the serial interface and bus 24, such as RS-422, Universal Serial Bus (USB), MIDI, or other protocols well known to those skilled in the art. For example, USB provides a relatively high speed serial interface that can provide force feedback signals in the present invention with a high degree of realism.

An advantage of the present invention is that low-bandwidth serial communication signals can be used to interface with interface device 14, thus allowing a standard built-in serial interface of many computers to be used directly. Alternatively, a parallel port of host computer system 12 can be coupled to a parallel bus 24 and communicate with interface device using a parallel protocol, such as SCSI or PC Parallel Printer Bus. In a different embodiment, bus 24 can be connected directly to a data bus of host computer system 12 using, for example, a plug-in card and slot or other access of computer system 12. For example, on an IBM AT compatible computer, the interface card can be implemented as an ISA, EISA, VESA local bus, PCI, or other well-known standard interface card which plugs into the motherboard of the computer and provides input and output ports connected to the main data bus of the computer.

In another embodiment, an additional bus 25 can be included to communicate between host computer system 12 and interface device 14. Since the speed requirement for communication signals is relatively high for outputting force feedback signals, the single serial interface used with bus 24 may not provide signals to and from the interface device at a high enough rate to achieve realistic force feedback. In such an embodiment, bus 24 can be coupled to the standard serial port of host computer 12, while an additional bus 25 can be coupled to a second port of the host computer system. For example, many computer systems include a "game port" in addition to a serial RS-232 port to connect a joystick or similar game controller to the computer. The two buses 24 and 25 can be used simultaneously to provide a increased data bandwidth. For example, microprocessor 26 can send sensor signals to host computer 12 via a unidirectional bus 25 and a game port, while host computer 12 can output force feedback signals from a serial port to microprocessor 26 via a uni-directional bus 25. Other combinations of data flow configurations if can be implemented in other embodiments.

Interface device 14 includes a local microprocessor 26, sensors 28, actuators 30, a user object 34, optional sensor interface 36, an optional actuator interface 38, and other optional input devices 39. Interface device 14 may also include additional electronic components for communicating via standard protocols on bus 24. In the preferred embodiment, multiple interface devices 14 can be coupled to a single host computer system 12 through bus 24 (or multiple buses 24) so that multiple users can simultaneously interface with the host application program (in a multi-player game or simulation, for example). In addition, multiple players can interact in the host application program with multiple interface devices 14 using networked host computers 12, as is well known to those skilled in the art.

Local microprocessor 26 is coupled to bus 24 and is preferably included within the housing of interface device 14 to allow quick communication with other components of the interface device. Processor 26 is considered "local" to interface device 14, where "local" herein refers to processor 26 being a separate microprocessor from any processors in host computer system 12. "Local" also preferably refers to processor 26 being dedicated to force feedback and sensor I/O of interface device 14, and being closely coupled to sensors 28 and actuators 30, such as within the housing for interface device or in a housing coupled closely to interface device 14. Microprocessor 26 can be provided with instructions to wait for commands or requests from computer host 16, decode the command or request, and handle/control input and output signals according to the command or request. Suitable microprocessors for use as local microprocessor 26 include the MC68HC711E9 by Motorola and the PIC16C74 by Microchip, for example. Microprocessor 26 can include one microprocessor chip, or multiple processors and/or co-processor chips. In other embodiments, microprocessor 26 can includes a digital signal processor (DSP) chip. Local memory (not shown), such as RAM and ROM, can be coupled to microprocessor 26 in interface device 14 to store instructions for microprocessor 14 and store temporary data. Microprocessor 26 can receive signals from sensors 28 and provide signals to actuators 30 of the interface device 14 in accordance with instructions provided by host computer system 12 over bus 24. For example, in one embodiment, host computer system 12 provides low-level force commands over bus 24, which microprocessor 26 directly provides to actuators 30. This embodiment is described in greater detail with respect to FIG. 4. In a different embodiment, host computer system 12 provides high level supervisory commands to microprocessor 26 over bus 24, and microprocessor 26 manages low level force control loops ("reflexes") to sensors 28 and actuators 30 in accordance with the high level commands. This embodiment is described in greater detail with respect to FIG. 5.

Microprocessor 26 preferably also has access to an electrically erasable programmable ROM (EEPROM) or other memory storage device for storing calibration parameters. The calibration parameters can compensate for slight manufacturing variations in different physical properties of the components of different interface devices made from the same manufacturing process, such as physical dimensions. The calibration parameters can be determined and stored by the manufacturer before the interface device 14 is sold, or optionally, the parameters can be determined by a user of the interface device. The calibration parameters are used by processor 26 to modify the input sensor signals and/or output force values to actuators 30 to provide approximately the same range of forces on object 34 in a large number of manufactured interface devices 14. The implementation of calibration parameters is well-known to those skilled in the art.

Microprocessor 26 can also receive commands from any other input devices included on interface apparatus 14 and provides appropriate signals to host computer 12 to indicate that the input information has been received and any information included in the input information. For example, buttons, switches, dials, or other input controls on interface device 14 can provide signals to microprocessor 14.

In the preferred embodiment, sensors 28, actuators 30, and microprocessor 26, and other related electronic components are included in a housing for interface device 14, to which user object 34 is directly or indirectly coupled. Alternatively, microprocessor 26 and/or other electronic components of interface device 14 can be provided in a separate housing from user object 34, sensors 28, and actuators 30. Also, additional mechanical structures may be included in interface device 14 to provide object 34 with desired degrees of freedom. Some embodiments of such mechanisms are described with reference to FIGS. 7–12.

Sensors 28 sense the position, motion, and/or other characteristics of a user object 34 of the interface device 14 along one or more degrees of freedom and provide signals to microprocessor 26 including information representative of those characteristics. Examples of embodiments of user objects and movement within provided degrees of freedom are described subsequently with respect to FIGS. 6–11. Typically, a sensor 28 is provided for each degree of freedom along which object 34 can be moved. Alternatively, a single compound sensor can be used to sense position or movement in multiple degrees of freedom. An example of sensors suitable for several embodiments described herein are digital optical encoders, which sense the change in position of an object about a rotational axis and provide digital signals indicative of the change in position. The encoder, for example, responds to a shaft's rotation by producing two phase-related signals in the rotary degree of freedom. Linear optical encoders similarly sense the to change in position of object 34 along a linear degree of freedom, and can produces the two phase-related signals in response to movement of a linear shaft in the linear degree of freedom. Either relative or absolute sensors can be used. For example, relative sensors only provide relative angle information, and thus usually require some form of calibration step which provide a reference position for the relative angle information. The sensors described herein are primarily relative sensors. In consequence, there is an implied calibration step after system power-up wherein a sensor's shaft is placed in a known position within interface device and a calibration signal is provided to the system to provide the reference position mentioned above. All angles provided by the sensors are thereafter relative to that reference position. Alternatively, a known index pulse can be provided in the relative sensor which can provide a reference position. Such calibration methods are well known to those skilled in the art and, therefore, will not be discussed in any great detail herein. A suitable optical encoder is the "Softpot" from U.S. Digital of Vancouver, Wash.

Sensors 28 provide an electrical signal to an optional sensor interface 36, which can be used to convert sensor signals to signals that can be interpreted by the microprocessor 26 and/or host computer system 12. For example, sensor interface 36 receives the two phase-related signals from a sensor 28 and converts the two signals into another pair of clock signals, which drive a bi-directional binary counter. The output of the binary counter is received by microprocessor 26 as a binary number representing the angular position of the encoded shaft. Such circuits, or equivalent circuits, are well known to those skilled in the art; for example, the Quadrature Chip LS7166 from Hewlett Packard, California performs the functions described above. Each sensor 28 can be provided with its own sensor interface, or one sensor interface may handle data from multiple sensors. For example, the electronic interface described in parent patent application Ser. No. 08/092,974 describes a sensor interface including a separate processing chip dedicated to each sensor that provides input data. Alternately, microprocessor 26 can perform these interface functions without the need for a separate sensor interface 36. The position value signals can be used by microprocessor 26 and are also sent to host computer system 12 which updates the host application program and sends force control signals as appropriate. For example, if the user moves a steering wheel object 34, the computer system 12 receives position and/or other signals indicating this movement and can move a displayed point of view of the user as if looking out a vehicle and turning the vehicle. Other interface mechanisms can also be used to provide an appropriate signal to host computer system 12. In alternate embodiments, sensor signals from sensors 28 can be provided directly to host computer system 12, bypassing microprocessor 26. Also, sensor interface 36 can be included within host computer system 12, such as on an interface board or card.

Alternatively, an analog sensor can be used instead of digital sensor for all or some of the sensors 28. For example, a strain gauge can be connected to measure forces on object 34 rather than positions of the object. Also, velocity sensors and/or accelerometers can be used to directly measure velocities and accelerations on object 34. Analog sensors can provide an analog signal representative of the position/velocity/acceleration of the user object in a particular degree of freedom. An analog to digital converter (ADC) can convert the analog signal to a digital signal that is received and interpreted by microprocessor 26 and/or host computer system 12, as is well known to those skilled in the art. The resolution of the detected motion of object 34 would be limited by the resolution of the ADC. However, noise can sometimes mask small movements of object 34 from an analog sensor, which can potentially mask the play that is important to some embodiments of the present invention (described subsequently).

Other types of interface circuitry 36 can also be used. For example, an electronic interface is described in U.S. patent application Ser. No. 08/092,974, entitled "3-D Mechanical Mouse", previously incorporated herein. The electronic interface described therein was designed for the Immersion PROBE™ 3-D mechanical mouse and has six channels corresponding to the six degrees of freedom of the Immersion PROBE. The interface allows the position of the mouse or stylus to be tracked and provides force feedback to the mouse using sensors and actuators. This system connects a host computer to a microprocessor via a serial interface.

Actuators 30 transmit forces to user object 34 of the interface device 14 in one or more directions along one or more degrees of freedom in response to signals received from microprocessor 26. Typically, an actuator 30 is provided for each degree of freedom along which forces are desired to be transmitted. Actuators 30 can include two types: active actuators and passive actuators.

Active actuators include linear current control motors, stepper motors, pneumatic/hydraulic active actuators, and other types of actuators that transmit a force to move an object. For example, active actuators can drive a rotational shaft about an axis in a rotary degree of freedom, or drive a linear shaft along a linear degree of freedom. Active transducers of the present invention are preferably bi-directional, meaning they can selectively transmit force along either direction of a degree of freedom. For example, DC servo motors can receive force control signals to control the direction and torque (force output) that is produced on a shaft. The motors may also include brakes which allow the rotation of the shaft to be halted in a short span of time. Other types of active motors can also be used, such as a stepper motor controlled with pulse width modulation of an applied voltage, pneumatic/hydraulic actuators, a torquer (motor with limited angular range), or a voice coil, which are well known to those skilled in the art.

Passive actuators can also be used for actuators 30. Magnetic particle brakes, friction brakes, or pneumatic/hydraulic passive actuators can be used in addition to or instead of a motor to generate a damping resistance or friction in a degree of motion. An alternate preferred embodiment only including passive actuators may not be as realistic as an embodiment including motors; however, the passive actuators are typically safer for a user since the user does not have to fight generated forces. Passive actuators typically can only provide bidirectional resistance to a degree of motion. A suitable magnetic particle brake for interface device 14 is available from Force Limited, Inc. of Santa Monica, Calif.

In alternate embodiments, all or some of sensors 28 and actuators 30 can be included together as a sensor/actuator pair transducer. A suitable transducer for the present invention including both an optical encoder and current controlled motor is a 20 W basket wound servo motor manufactured by Maxon.

Actuator interface 38 can be optionally connected between actuators 30 and microprocessor 26. Interface 38 converts signals from microprocessor 26 into signals appropriate to drive actuators 30. Interface 38 can include power amplifiers, switches, digital to analog controllers (DACs), and other components. An example of an actuator interface for active actuators is described with reference to FIG. 2. An example of an actuator interface for passive actuators is described with reference to FIG. 3. In alternate embodiments, interface 38 circuitry can be provided within microprocessor 26 or in actuators 30.

Other input devices 39 can optionally be included in interface device 14 and send input signals to microprocessor 26. Such input devices can include buttons, dials, switches, or other mechanisms. For example, in embodiments where user object 34 is a joystick, other input devices can include one or more buttons used to supplement the input from the user to a game or simulation. The operation of such input devices is well known to those skilled in the art.

Power supply 40 can optionally be coupled to actuator interface 38 and/or actuators 30 to provide electrical power. Active actuators typically require a separate power source to be driven. Power supply 40 can be included within the housing of interface device 14, or can be provided as a separate component, for example, connected by an electrical power cord.

Safety switch 41 is preferably included in interface device to provide a mechanism to allow a user to override and deactivate actuators 30, or require a user to activate actuators 30, for safety reasons. Certain types of actuators, especially active actuators such as motors, can pose a safety issue for the user if the actuators unexpectedly move user object 34 against the user with a strong force. In addition, if a failure in the control system 10 occurs, the user may desire to quickly deactivate the actuators to avoid any injury. To provide this option, safety switch 41 is coupled to actuators 30. In the preferred embodiment, the user must continually activate or close safety switch 41 during operation of interface device 14 to activate the actuators 30. If, at any time, the safety switch is deactivated (opened), power from power supply 40 is cut to actuators 30 (or the actuators are otherwise deactivated) as long as the safety switch is deactivated. For example, a preferred embodiment of safety switch is an optical switch located on user object 34 (such as a joystick) or on a convenient surface of a housing enclosing interface device 14. When the user covers the optical switch with a hand or finger, the sensor of the switch is blocked from sensing ambient light, and the switch is closed. The actuators 30 thus will function as long as the user covers the switch. Other types of safety switches 41 can be provided in other embodiments. For example, an electrostatic contact switch can be used to sense contact, a button or trigger can be pressed, or a different type of sensor switch can be used.

User object 34 is preferably a device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, medical instrument (laparoscope, catheter, etc.), pool cue, hand grip, knob, button, or other article.

Figure 2:
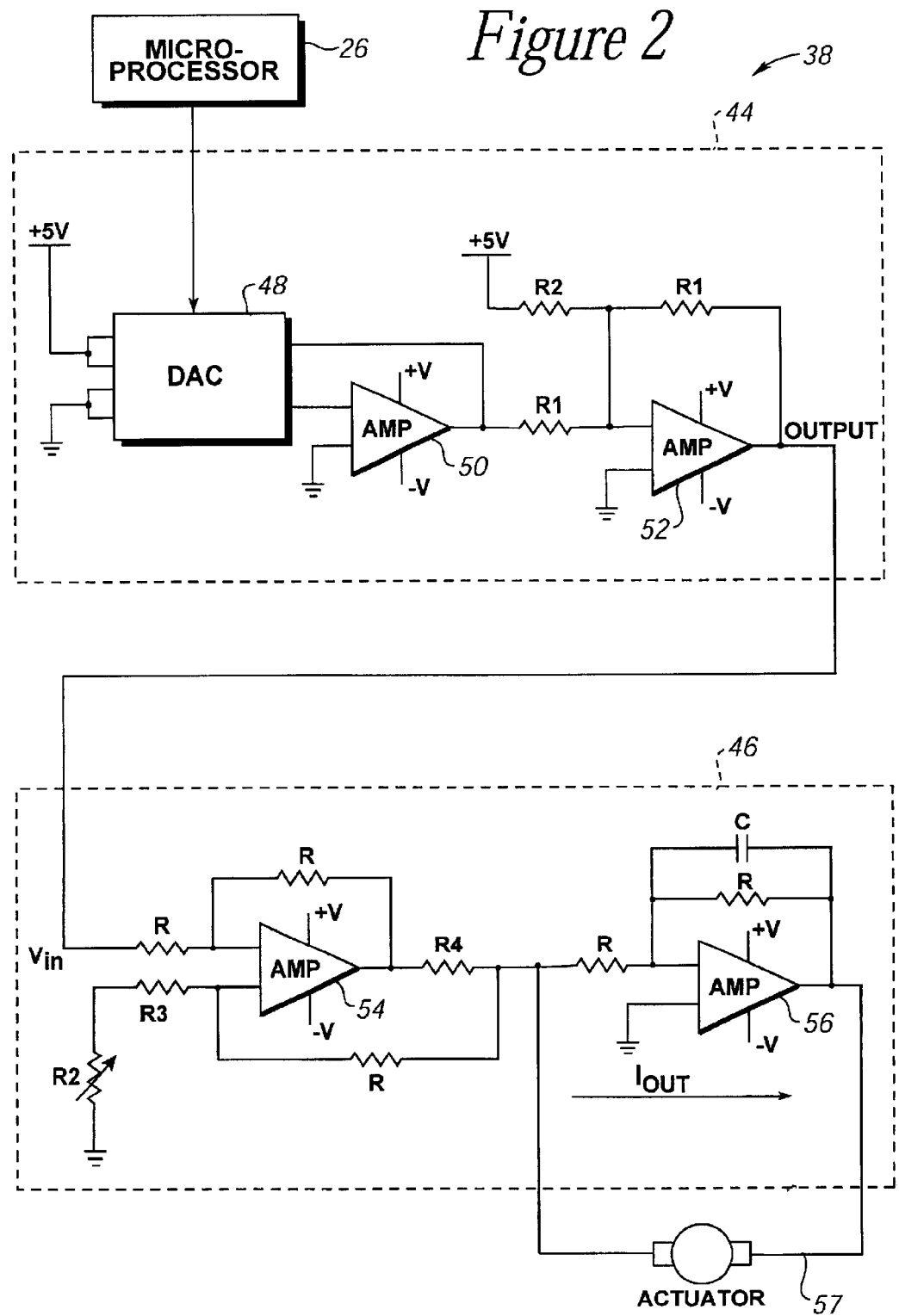
FIG. 2 is a schematic diagram of an actuator interface for providing control signals to an active actuator for the present invention.

FIG. 2 is a schematic diagram illustrating an example of an actuator interface 38 for an active actuator 30 of interface device 14. In this example, actuator 30 is a linear current controlled servo motor. Actuator interface 38 includes a DAC circuit 44 and a power amplifier circuit 46.

DAC circuit 44 is coupled to microprocessor 26 and preferably receives a digital signal representing a force value from the microprocessor 26. DAC 48 is suitable for converting an input digital signal to an analog voltage that is output to power amplifier circuit 46. A suitable DAC 48 is a parallel DAC, such as the DAC1220 manufactured by National Semiconductor, which is designed to operate with external generic op amp 50. Op amp 50, for example, outputs a signal from zero to −5 volts proportional to the binary number at its input. Op amp 52 is an inverting summing amplifier that converts the output voltage to a symmetrical bipolar range. Op amp 52 produces an output signal between −2.5 V and +2.5 V by inverting the output of op amp 50 and subtracting 2.5 volts from that output; this output signal is suitable for power amplification in amplification circuit 46. As an example, R1=200 kΩ and R2=400 kΩ. Of course, DAC circuit 44 is intended as one example of many possible circuits that can be used to convert a digital signal to a desired analog signal.

Power amplifier circuit 46 receives an analog low-power control voltage from DAC circuit 44 and amplifies the voltage to control actuators 30. Actuator 30 can be a high-power, current-controlled servo motor 30. The input voltage controls a transconductance stage composed of amplifier 54 and several resistors. The transconductance stage produces an output current proportional to the input voltage to drive motor 30 while drawing very little current from the input voltage source. The second amplifier stage, including amplifier 56, resistors, and a capacitor C, provides additional current capacity by enhancing the voltage swing of the second terminal 57 of motor 30. As example values for power amplifier circuit 46, R=10 kΩ, R2=500 Ω, R3=9.75 kΩ, and R4=1 Ω. Of course, circuit 46 is intended as one example of many possible circuits that can be used to amplify voltages to drive active actuators 30.

Figure 3:
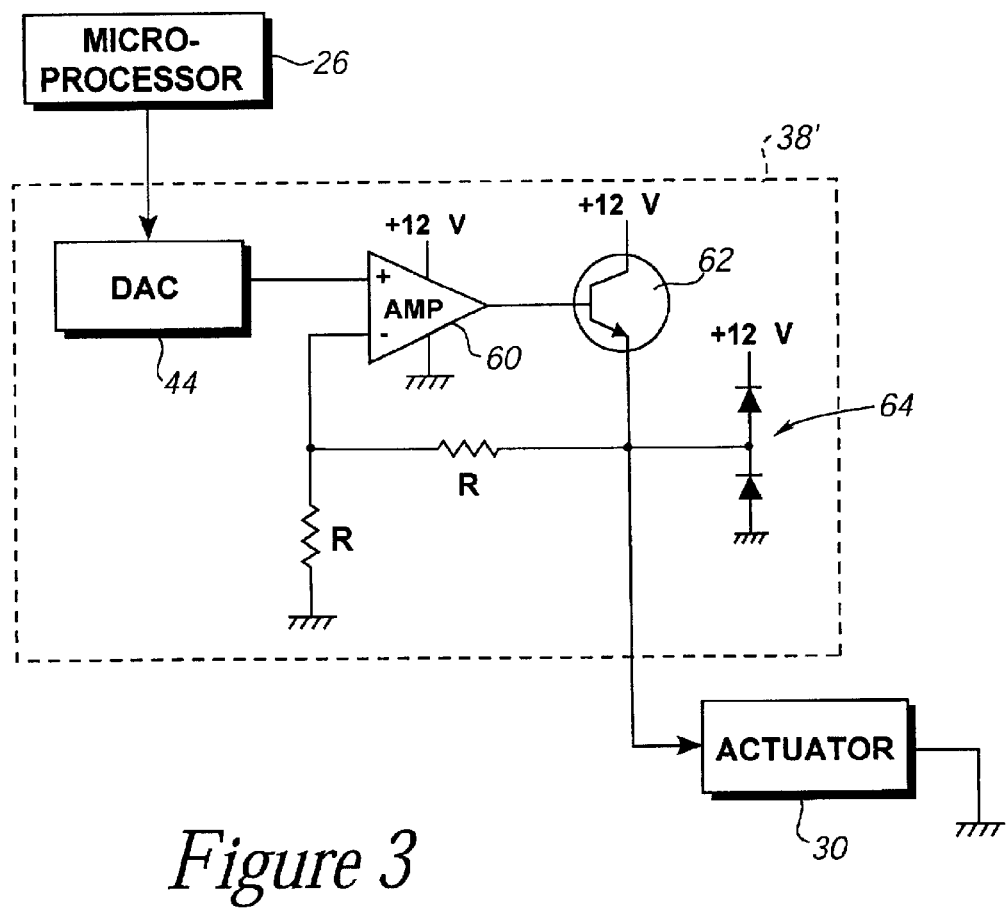
FIG. 3 is a schematic diagram of an actuator interface for providing control signals to a passive actuator for the present invention.

FIG. 3 is a schematic diagram illustrating an example of an actuator interface 38' that can be used in conjunction with passive actuators. Interface 38' is suitable for use with passive actuators (dampers) that are controlled with an analog voltage, such as magnetic particle brakes or a variable solenoid used with the fluid controlled passive dampers of parent application 08/489,068. Interface 38' includes a DAC circuit 44, amplifier 60, transistor 62, and voltage protector 64. DAC circuit 44 is coupled to microprocessor 26 and receives a digital signal from the computer system representing a resistive force value to be applied to user object 34. DAC circuit 44 converts the digital signal voltages to analog voltages which are then output to amplifier 60. A suitable DAC is the MAX530ACNG manufactured by Maxim, or DAC circuit 44 as described above with reference to FIG. 2. Amplifier 60 receives the analog voltage from DAC 44 on a positive terminal and scales the voltage signal to a range usable by actuator 30. Amplifier 60 can be implemented as an operational amplifier or the like. Transistor 62 is coupled to the output of amplifier 60 and preferably operates as an amplifier to provide increased output current to actuator 30. Resistor R1 is coupled between amplifier 60 and the emitter of transistor 62, and resistor R2 is coupled between amplifier 60 and ground. For example, resistors R1 and R2 can have values of 180 kΩ and 120 kΩ, respectively, and provide the proper biasing in the circuit. Voltage protector 64 is coupled to the emitter of transistor 62 and provides protection from voltage spikes when using inductive loads. Suitable passive actuators 30 for use with this circuitry includes variable solenoids or magnetic particle brakes. A separate DAC and amplifier can be used for each actuator 30 implemented in the interface apparatus so the microprocessor 26 and/or host computer system 12 can control each actuator separately for each provided degree of freedom. Interface 38' is intended as one example of many possible circuits that can be used to interface a computer system to actuators.

In an alternate embodiment, an on/off signal might only be needed, for example, for a solenoid driving an on/off valve of a fluid-controlled actuator as described in co-pending patent application Ser. No. 08/489,068 and below in FIG. 10. In such an embodiment, for example, a transistor can be electrically coupled to microprocessor 26 at its base terminal to operate as an electrical switch for controlling the activation of a solenoid in the on/off actuator 30. A force signal such as a TTL logic signal can be sent to control the transistor to either allow current to flow through the solenoid to activate it and allow free movement of object 43, or to allow no current to flow to deactivate the solenoid and provide resistance to movement.

Figure 4:
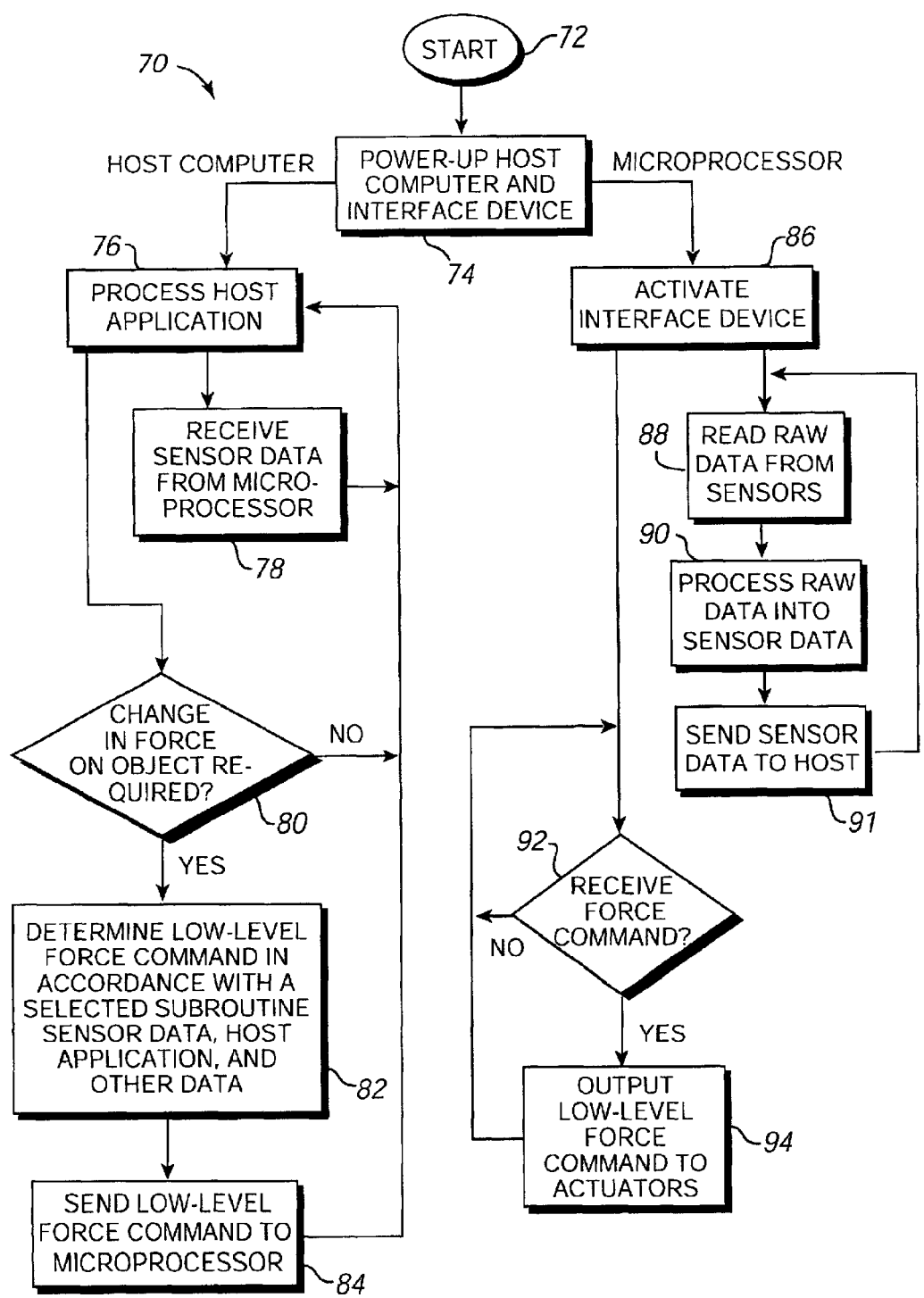
FIG. 4 is a flow diagram illustrating a first embodiment of a method of the present invention for controlling a force feedback interface device.

FIG. 4 is a flow diagram illustrating a first embodiment of a method 70 for controlling a force feedback interface device of the present invention. Method 70 is directed to a "host-controlled" embodiment, in which host computer system 12 provides direct, low-level force commands to microprocessor 26, and the microprocessor directly provides these force commands to actuators 30 to control forces output by the actuators.

The process begins at 72. In step 74, host computer system 12 and interface device 14 are powered up, for example, by a user activating power switches. After step 74, the process 70 branches into two parallel (simultaneous) processes. One process is implemented on host computer system 12, and the other process is implemented on local microprocessor 26. These two processes branch out of step 74 in different directions to indicate this simultaneity.

In the host computer system process, step 76 is first implemented, in which an application program is processed or updated. This application can be a simulation, video game, scientific program, or other program. Images can be displayed for a user on output display screen 20 and other feedback can be presented, such as audio feedback.

Two branches exit step 76 to indicate that there are two processes running simultaneously (multitasking) on host computer system 12. In one process, step 78 is implemented, where sensor data is received by the host computer from local microprocessor 26. As detailed below in the microprocessor process, the local processor 26 continually receives signals from sensors 28, processes the raw data, and sends processed sensor data to host computer 12, Alternatively, local processor 26 sends raw data directly to host computer system 12. The sensor data can include position values, velocity values, and/or acceleration values derived from the sensors 28 which detect motion of object 34 in one or more degrees of freedom. In addition, any other data received from other input devices 39 can also be received by host computer system 12 as sensor data in step 78, such as signals indicating a button on interface device 14 has been activated by the user.

After sensor data is read in step 78, the process returns to step 76, where the host computer system 12 can update the application program in response to the user's manipulations of object 34 and any other user input received in step 78 as well as determine if forces need to be applied to object 34 in the parallel process. Step 78 is implemented in a continual loop of reading data from local processor 26.

The second branch from step 76 is concerned with the process of the host computer determining force commands to provide force feedback to the user manipulating object 34. These commands are described herein as "low-level" force commands, as distinguished from the "high-level" or supervisory force commands described in the embodiment of FIG. 5. A low level force command instructs an actuator to output a force of a particular magnitude. For example, the low level command typically includes a magnitude force value, e.g., equivalent signal(s) to instruct the actuator to apply a force of a desired magnitude value. Low level force commands may also designate a direction of force if an actuator can apply force in a selected direction, and/or other low-level information as required by an actuator.

The second branch starts with step 80, in which the host computer system checks if a change in the force applied to user object 34 is required. This can be determined by several types of criteria, the most important of which are the sensor data read by the host computer in step 78, timing data, and the implementation or "events" of the application program updated in step 76. The sensor data read in step 78 informs the host computer 12 how the user is interacting with the application program. From the position of object 34 sensed over time, the host computer system 12 can determine when forces should be applied to the object. For example, if the host computer is implementing a video game application, the position of a computer generated object within the game may determine if a change in force feedback is called for. If the user is controlling a simulated race car, the position of the user object joystick determines if the race car is moving into a wall and thus if a collision force should be generated on the joystick. In addition, the velocity and/or acceleration of the user object can influence whether a change in force on the object is required. If the user is controlling a tennis racket in a game, the velocity of a user object joystick in a particular degree of freedom may determine if a tennis ball is hit and this if an appropriate force should be applied to the joystick. Also, other input, such as a user activating buttons or other controls on interface device 14, can change the forces required on object 34 depending on how those controls have been programmed to affect the application program.

Other criteria for determining if a change in force is required includes events in the application program. For example, a game application program may (perhaps randomly) determine that another object in the game is going to collide with an object controlled by the user, regardless of the position data of the user object 34. Forces should thus be applied to the user object dependent on this collision event to simulate an impact. Forces can be required on the user object depending on a combination of such an event and the sensor data read in step 78. Other parameters in the application program can determine if a change in force to the user object is necessary, such as other input devices or user interface devices connected to host computer system 12 and inputting data to the application program (other interface devices can be directly connected, connected remotely through a network, etc.).

If no change in force is currently required in step 80, then the process returns to step 76 to update the host application and return to step 80 to again check until such a change in force is required. When such a change is required, step 82 is implemented, in which host computer 12 determines appropriate low-level force commands to be sent to the actuators 30 of interface device 14, these force commands being dependent on a selected subroutine, sensor data, the host application, and the clock 18.

The low-level force commands can be determined, in part, from a selected subroutine. A "subroutine" or "local process", as referred to herein, is a set of instructions for providing force commands dependent on other parameters, such as sensor data read in step 78 and timing data from clock 18. In the described embodiment, subroutines can include several different types of instructions. One type of instruction is a force algorithm, which includes an equation that host computer 12 can use to calculate or model a force value based on sensor and timing data. Several types of algorithms can be used. For example, algorithms in which force varies linearly (or nonlinearly) with the position of object 34 can be used to provide a simulated force like a spring. Algorithms in which force varies linearly (or nonlinearly) with the velocity of object 34 can be also used to provide a simulated damping force or other forces. Algorithms in which force varies linearly (or nonlinearly) with the acceleration of object 34 can also be used to provide, for example, a simulated inertial force on a mass (for linear variation) or a simulated gravitational pull (for nonlinear variation). Several types of simulated forces and the algorithms used to calculate such forces are described in "Perceptual Design of a Virtual Rigid Surface Contact," by Louis B. Rosenberg, Center for Design Research, Stanford University, Report number AL/CF-TR-1995-0029, April 1993, and is incorporated by reference herein.

For force values depending on the velocity and acceleration of user object 34, the velocity and acceleration can be provided in a number of different ways. The sensor data read by host computer 12 in step 78 can include position data, velocity data, and acceleration data. In a preferred embodiment, the velocity and acceleration data was calculated previously by microprocessor 26 and then provided to the host computer 12. The host computer can thus use the velocity and acceleration data directly in an algorithm to calculate a force value. In an alternate embodiment, the sensor data read in step 78 includes position data and no velocity or acceleration data, so that host computer 12 is required to calculate the velocity and acceleration from the position data. This can be accomplished by recording a number of past position values, recording the time when each such position value was received using the system clock 18, and calculating a velocity and/or acceleration from such data.

For example, a kinematic equation which calculates force based on the velocity of the user object multiplied by a damping constant can be used to determine a damping force on the user object. This type of equation can simulate motion of object 34 along one degree of freedom through a fluid or similar material. A procedure for calculating a damping force on object 34 is described in co-pending parent application Ser. No. 08/400,233, filed Mar. 3, 1995, which is hereby incorporated by reference herein. For example, a damping constant can first be selected which indicates the degree of resistance that object 34 experiences when moving through a simulated material, such as a liquid, where a greater number indicates greater resistance. For example, water would have a lower damping constant than oil or syrup. The host computer recalls the previous position of user object 34 (along a particular degree of freedom), examine the current position of the user object, and calculate the difference in position. From the sign (negative or positive) of the difference, the direction of the movement of object 34 can also be determined. The force is then set equal to the damping constant multiplied by the change in position. Commands that controlled an actuator based on this algorithm would produce a force proportional to the user object's motion to simulate movement through a fluid. Movement in other mediums, such as on a bumpy surface, on an inclined plane, etc., can be simulated in a similar fashion using different methods of calculating the force.

The determination of force commands is preferably influenced by timing information accessed from system clock 18. For example, in the damping force example described above, the velocity of the user object 34 is determined by calculating the different of positions of the user object and multiplying by the damping constant. This calculation assumes a fixed time interval between data points, i.e., it is assumed that the position data of the object 34 is received by host computer 12 in regular, predetermined time intervals. However, this may not actually occur due to different processing speeds of different computer platforms or due to processing variations on a single host microprocessor 16, such as due to multitasking. Therefore, in the present invention, the host computer preferably accesses clock 12 to determine how much time has actually elapsed since the last position data was received. In the damping force example, the host computer could take the difference in position and divide it by a time measure to account for differences in timing.

The host computer can thus use the clock's timing information in the modulation of forces and force sensations to the user. Timing information can be used in other algorithms and subroutines of the present invention to provide repeatable and consistent force feedback regardless of type of platform or available processing time on host computer 12.

Other instructions can also be included in a subroutine. For example, conditions can be included to provide forces only in desired directions or under other particular circumstances. For, example, to simulate a virtual obstruction such as a wall, forces should be applied in only one direction (uni-directional). For many passive actuators, only bi-directional resistance forces can be applied. To simulate uni-direction resistance, conditions can be included in the virtual obstruction subroutine. An example of such conditions in a virtual obstruction subroutine is described with respect to FIG. 12. Also, a "null" subroutine can be available that instructs host computer 12 to issue a command to provide zero forces (i.e. remove all forces) on user object 34.

Another type of subroutine does not use algorithms to model a force, but instead uses force values that have been previously calculated or sampled and stored as a digitized "force profile" in memory or other storage device. These force values may have been previously generated using an equation or algorithm as described above, or provided by sampling and digitizing forces. For example, to provide a particular force sensation to the user, host computer 12 can be instructed by a subroutine to retrieve successive force values from a certain storage device, such as RAM, ROM, hard disk, etc. These force values can be sent directly to an actuator in a low-level command to provide particular forces without requiring host computer 12 to calculate the force values. In addition, previously-stored force values can be output with respect to other parameters to provide different types of forces and force sensations from one set of stored force values. For example, using system clock 18 the stored force values can be output in sequence according to a particular time interval that can vary depending on the desired force. Or, different retrieved force values can be output depending on the current position of user object 34.

Host computer 12 can determine a force command in step 82 according to a newly-selected subroutine, or to a previously selected subroutine. For example, if this is a second or later iteration of step 82, the same subroutine as in the previous iteration can be again implemented if parameters (such as the position of object 34) allow it, as determined by the host application program.

The force command determined in step 82 can also depend on instructions that check for other parameters. These instructions can be included within or external to the above-described subroutines. One such parameter are values provided by the implemented host application program (if any). The application program may determine that a particular force command should be output or subroutine implemented based on events occurring within the application program or other instructions. Force commands or values can be provided by the host application program independently of sensor data. Also, the host application program can provide its own particular position, velocity, and/or acceleration data to a selected subroutine to calculate or provide a force that is not based on the manipulation of user object 34, but is provided to simulate an event in the application program. Such events may include collision events, such as occur when a user-controlled computer image impacts a virtual surface or structure. Also, other input devices connected to host computer 12 can influence events and, therefore, the forces applied to user object 34. For example, the sensor data from multiple interface devices 14 connected to a single host computer can influence the forces felt on other connected interface devices by influencing events and computer-controlled images/objects of the host application program.

Also, the force commands determined in step 82 can be based on other inputs to host computer 12, such as activations of buttons or other input devices in (or external to) interface device 14. For example, a particular application program might require that a force be applied to a joystick whenever a user presses a fire button on the joystick.

The above-described subroutines and other parameters can be used to provide a variety of haptic sensations to the user through the user object 34 to simulate many different types of tactile events. For example, typical haptic sensations may include a virtual damping (described above), a virtual obstruction, and a virtual texture. Virtual obstructions are provided to simulate walls, obstructions, and other unidirectional forces in a simulation, game, etc. When a user moves a computer image into a virtual obstruction with a joystick, the user then feels a physical resistance as he or she continues to move the joystick in that direction. If the user moves the object away from the obstruction, the unidirectional force is removed. Thus the user is given a convincing sensation that the virtual obstruction displayed on the screen has physical properties. Similarly, virtual textures can be used to simulate a surface condition or similar texture. For example, as the user moves a joystick or other user object along an axis, the host computer sends a rapid sequence of commands to repetitively 1) apply resistance along that axis, and 2) to then immediately apply no resistance along that axis, as according to a subroutine. This frequency is based upon the travel of the joystick handle and is thus correlated with spatial position. Thus, the user feels a physical sensation of texture, which can be described as the feeling of dragging a stick over a grating.

In next step 84, a low-level force command determined in step 82 is output to microprocessor 26 over bus 24. This force command typically includes a force value that was determined in accordance with the parameters described above. The force command can be output as an actual force signal that is merely relayed to an actuator 30 by microprocessor 26; or, the force command can be converted to an appropriate form by microprocessor 26 before being sent to actuator 30. In addition, the low-level force command preferably includes information indicating to microprocessor 26 which actuators are to receive this force value (if multiple actuators are included on interface device 14). The process then returns to step 76 to process/update the host application program. The process continues to step 80, where the host computer checks if a different force command should be output as determined by the parameters described above. If so, a new force command is determined and output in step 84. If no change of force is required, host computer 12 does not issue another command, since microprocessor 26 can continues to output the previous force command to actuators 30 (alternatively, host computer 12 can continue to output commands, even if no change of force is required). Subsequent force commands output in step 84 can be determined in accordance with the same subroutine, or a different subroutine, depending on the parameters of step 82.

In addition, the host computer 12 preferably synchronizes any appropriate visual feedback, auditory feedback, or other feedback related to the host application with the application of forces on user object 34. For example, in a video game application, the onset or start of visual events, such as an object colliding with the user on display screen 20, should be synchronized with the onset or start of forces felt by the user which correspond to or complement those visual events. The onsets visual events and force events are preferably occur within about 30 milliseconds (ms) of each other. This span of time is the typical limit of human perceptual ability to perceive the events as simultaneous. If the visual and force events occur outside this range, then a time lag between the events can usually be perceived. Similarly, the output of auditory signals, corresponding to the onset of auditory events in the host application, are preferably output synchronized with the onset of output forces that correspond to/complement those auditory events. Again, the onsets of these events occur preferably within about 30 ms of each other. For example, host computer system 12 can output sounds of an explosion from speakers 21 as close in time as possible to the forces felt by the user from that explosion in a simulation. Preferably, the magnitude of the sound is in direct (as opposed to inverse) proportion to the magnitude of the forces applied to user object 34. For example, during a simulation, a low sound of an explosion in the far (virtual) distance can cause a small force on user object 34, while a large, "nearby" explosion might cause a loud sound to be output by the speakers and a correspondingly large force to be output on object 34.

The local microprocessor 26 implements the process branching from step 74 and starting with step 86 in parallel with the host computer process described above. In step 86, the interface device 14 is activated. For example, signals can be sent between host computer 12 and interface device 14 to acknowledge that the interface device is now active. From step 86, two processes branch to indicate that there are two processes running simultaneously (multi-tasking) on local processor 26. In one process, step 88 is implemented, in which the processor 26 reads raw data from sensors 28. Such raw data preferably includes position values describing the position of the user object along provided degrees of freedom. In the preferred embodiment, sensors 28 are relative sensors that provide position values describing the change in position since the last position read. Processor 26 can determine the absolute position by measuring the relative position from a designated reference position. In alternate embodiments, sensors 28 can include velocity sensors and accelerometers for providing raw velocity and acceleration values of object 34. The raw data read in step 88 can also include other input, such as from an activated button or other control 39 of interface device 14.

In next step 90, processor 26 processes the received raw data into sensor data. In the preferred embodiment, this processing includes two steps: computing velocity and/or acceleration values from raw position data (if velocity and/or acceleration are needed to compute forces), and filtering the computed velocity and acceleration data. The velocity and acceleration values are computed from raw position data received in step 88 and stored position and time values. Preferably, processor 26 stores a number of position values and time values corresponding to when the position values were received. Processor 26 can use its own or a local system clock (not shown in FIG. 1) to determine the timing data. The velocity and acceleration can be computed using the stored position data and timing information, as is well known to those skilled in the art. The calculated velocity and/or acceleration values can then be filtered to remove noise from the data, such as large spikes that may result in velocity calculations from quick changes in position of object 34. Thus, the sensor data in the described embodiment includes position, velocity, acceleration, and other input data. In an alternate embodiment, circuitry that is electrically coupled to but separate from processor 26 can receive the raw data and determine velocity and acceleration. For example, an application-specific integrated circuit (ASIC) or discrete logic circuitry can use counters or the like to determine velocity and acceleration to save processing time on microprocessor 26.

Alternatively, step 90 can be omitted, and the processor 26 can provide raw position data to host computer 12 (and other input data from other input devices 39). This would require host computer 12 to filter and compute velocity and acceleration from the position data. Thus, it is preferred that processor 26 do this processing to reduce the amount of processing performed on host computer 12. In other embodiments, the filtering can be performed on host computer 12 while the velocity and acceleration calculation can be performed on the processor 26. Also, in embodiments where velocity and/or acceleration sensors are used to provide raw velocity and acceleration data, the calculation of velocity and/or acceleration can be omitted. After step 90, step 91 is implemented, in which the processor 26 sends the processed sensor data to the host computer 12 via bus 24. The process then returns to step 88 to read raw data. Steps 88, 90 and 91 are thus continuously implemented to provide current sensor data to host computer system 12.

The second branch from step 86 is concerned with processor 26 controlling the actuators 30 to provide forces calculated by host computer 12 to object 34. The second branch starts with step 92, in which processor 26 checks if a low-level force command has been received from host computer 12 over bus 24. If not, the process continually checks for such a force command. When a force command has been received, step 94 is implemented, in which processor 26 outputs a low-level processor force command to the designated actuators to set the output force to the desired magnitude, direction, etc. This force command may be equivalent to the received low-level command from the host computer, or, the processor 26 can optionally convert the force command to an appropriate form usable by actuator 30 (or actuator interface 38 can perform such conversion). The process then returns to step 92 to check for another force command from the host computer 12.

Figure 5:
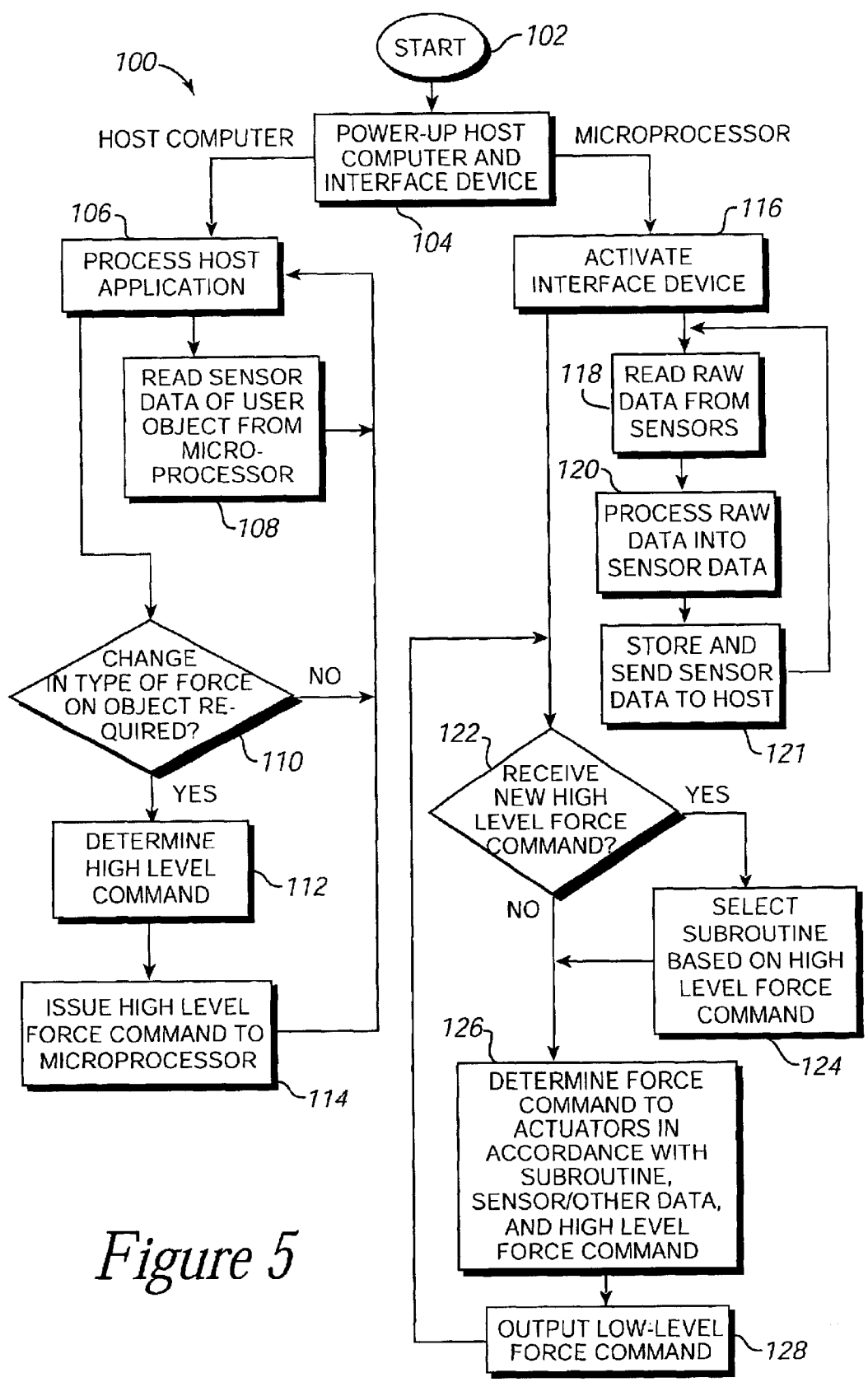
FIG. 5 is a flow diagram illustrating a second embodiment of a method of the present invention for controlling a force feedback interface device.

FIG. 5 is a flow diagram illustrating a second embodiment of a method 100 for controlling force feedback interface device 14 of the present invention. Method 100 is directed to a "reflex" embodiment, in which host computer system 12 provides only high-level supervisory force commands to microprocessor 26, while the microprocessor independently determines and provides low-level force commands to actuators 30 as a "reflex" to control forces output by the actuators.

The process begins at 102. In step 104, host computer system 12 and interface device 14 are powered up, for example, by a user activating power switches. After step 104, the process 100 branches into two parallel processes. One process is implemented on host computer system 12, and the other process is implemented on local microprocessor 26.

In the host computer system process, step 106 is first implemented, in which an application program is processed. This application can be a simulation, video game, scientific program, or other program. Images can be displayed for a user on output display screen 20 and other feedback can be presented, such as audio feedback.

Two branches exit step 106 to indicate that there are two processes running simultaneously (multi-tasking, etc.) on host computer system 12. In one of the processes, step 108 is implemented, where sensor data from the user object is received by the host computer from local microprocessor 26. Similarly to step 78 of the process of FIG. 4, host computer system 12 receives either raw data (e.g., position data and no velocity or acceleration data) or processed sensor data (position, velocity and/or acceleration data) from microprocessor 26. In addition, any other data received from other input devices 39 can also be received by host computer system 12 from microprocessor 26 in step 108, such as signals indicating a button on interface device 14 has been pressed by the user.

Unlike the previous embodiment of FIG. 4, the host computer does not calculate force values from the received sensor data in step 108. Rather, host computer 12 monitors the sensor data to determine when a change in the type of force is required. This is described in greater detail below. Of course, host computer 12 also uses the sensor data as input for the host application to update the host application accordingly.

After sensor data is received in step 108, the process returns to step 106, where the host computer system 12 can update the application program in response to the user's manipulations of object 34 and any other user input received in step 108. Step 108 is then implemented again in a continual loop of receiving sets of sensor data from local processor 26. Since the host computer does not need to directly control actuators based on sensor data, the sensor data can be provided at a much lower speed. For example, since the host computer updates the host application and images on display screen 20 in response to sensor data, the sensor data need only be read at 60–70 Hz (the refresh cycle of a typical display screen) compared to the much higher rate of about 1000 Hz (or greater) needed to realistically provide low-level force feedback signals from sensor signals. Host computer 12 also preferably synchronizes visual, audio, and force events similarly as described above with reference to FIG. 4.

The second branch from step 106 is concerned with the process of the host computer determining high-level force commands to provide force feedback to the user manipulating object 34. The second branch starts with step 110, in which the host computer system checks if a change in the type of force applied to user object 34 is required. The "type" of force is a force sensation or profile produced by a particular subroutine or force value which the local microprocessor can implement independently of the host computer. The host computer 12 determines whether a change in the type of force is required depending on the sensor data read by the host computer in step 108 and depending on the events of the application program updated in step 106. As explained with reference to FIG. 4, the sensor data informs the host computer when forces should be applied to the object based on the object's current position, velocity, and/or acceleration. The user's manipulations of object 34 may have caused a new type of force to required. For example, if the user is moving a virtual race car within a virtual pool of mud in a video game, a damping type of force should be applied to the object 34 as long as the race car moves within the mud. Thus, damping forces need to be continually applied to the object, but no change in the type of force is required. When the race car moves out of the pool of mud, a new type of force (i.e. a removal of damping force in this case) is required. The events of the application program may also require a change in the type of force applied. For example, if the user's car is travelling through mud and another car collides into the user's car, then a new type of force (collision force) should be applied to the user object. Forces may be required on the user object depending on a combination of an application event and the sensor data read in step 108. Also, other input, such as a user activating buttons or other input devices 39 on interface device 14, can change the type of forces required on object 34.

If no change in the type of force is currently required in step 110, then the process returns to step 106 to update the host application and return to step 110 to again check until such a change in the type of force is required. When such a change is required, step 112 is implemented, in which host computer 12 determines an appropriate high level command to send to microprocessor 26. The available high level commands for host computer 12 preferably each correspond to an associated subroutine implemented by microprocessor 26. For example high level commands to provide a damping force, a spring force, a gravitational pull, a bumpy surface force, a virtual obstruction force, and other forces can be available to host computer 12. These high level commands preferably also include a designation of the particular actuators 30 which are to apply this desired force on object 34. The high level commands can also include other parameter information which might vary the force produced by a particular subroutine. For example, a damping constant can be included in a high level command to designate a desired amount of damping force. The high level command may also preferably override the reflex operation of the processor 26 and include low-level force commands. In next step 114, the host computer sends the high level command to the microprocessor 26 over bus 24. The process then returns to step 106 to update the host application and to return to step 110 to check if another change in force is required.

The local microprocessor 26 implements the process branching from step 104 and starting with step 116 in parallel with the host computer process described above. In step 116, the interface device 14 is activated. For example, signals can be sent between host computer 12 and interface device 14 to acknowledge that the interface device is now active and can be commanded by host computer 12. From step 116, two processes branch to indicate that there are two processes running simultaneously (multi-tasking) on local processor 26. In one process, step 118 is implemented, in which the processor 26 reads raw data from sensors 28. As described in step 88 of FIG. 4, processor 26 preferably reads position data and no velocity or acceleration data from sensors 28. In alternate embodiments, sensors 28 can include velocity sensors and accelerometers for providing velocity and acceleration values of object 34. The sensor data read in step 118 can also include other input, such as from an activated button or other control of interface device 14.

In next step 120, processor 26 processes the received raw data into sensor data. As described in step 90 of FIG. 4, this processing preferably includes the two steps of computing velocity and acceleration data from the filtered position data and filtering the velocity and acceleration data. Processor 26 can use its own system clock (not shown in FIG. 1) to determine the timing data needed for computing velocity and acceleration. In embodiments where velocity and/or acceleration sensors are used, the calculation of velocity and/or acceleration is omitted. In next step 121, the processor 26 sends the processed sensor data to host computer 12 and also stores the data for computing forces, as described in the second branch process of processor 26. The process then returns to step 118 to read raw data. Steps 118, 120 and 121 are thus continuously implemented to provide current sensor data to processor 26 and host computer 12.

The second branch from step 116 is concerned with processor 26 controlling the actuators 30 to provide forces to object 34. The second branch starts with step 122, in which processor 26 checks if a high level force command has been received from host computer 12 over bus 24. If so, the process continues to step 124, where a subroutine associated with the high level command is selected. Such subroutines can be stored local to microprocessor 26 in, for example, memory such as RAM or ROM (or EPROM, EEPROM, etc.). Thus, the microprocessor might select a damping subroutine if the high level command indicated that the damping force from this subroutine should be applied to object 34. The available subroutines are preferably similar to those described above with reference to FIG. 4, and may include algorithms, stored force profiles or values, conditions, etc. In some embodiments, steps 118, 120, and 121 for reading sensor data can be incorporated in the subroutines for the microprocessor, so that sensor data is only read once a subroutine has been selected. Also, the high level command may in some instances simply be a low-level force command that provides a force value to be sent to an actuator 30 (as in the embodiment of FIG. 4), in which case a subroutine need not be selected.

After a subroutine has been selected in step 124, or if a new high level force command has not been received in step 122, then step 126 is implemented, in which processor 26 determines a processor low-level force command. The force command is derived from the subroutine and any other parameters required by the subroutine as well as parameters included in the most recently-received high level command. As explained above, the parameters can include sensor data and/or timing data from a local system clock. Thus, if no new high level command was received in step 122, then the microprocessor 26 determines a force command according to the same subroutine that it was previously using in step 126. In addition, the high level force command from the host computer can include other parameter information needed to determine a force command. For example, the high level command can indicate the direction of a force along a degree of freedom.

In step 128, processor 26 outputs the determined processor force command to actuators 30 to set the output force to the desired level. Before sending out the force command, processor 26 can optionally convert the force command to an appropriate form usable by actuator 30, or actuator interface 38 can perform such conversion. The process then returns to step 122 to check if another high level force command has been received from the host computer 12.

The reflex process of microprocessor 26 (steps 118, 120, 122, 124, 126, and 128) thus operates to provide forces on object 34 independently of host computer 12 according to a selected subroutine and other parameters. The subroutine determines how the force command is to be determined based on the most recent sensor data read by microprocessor 26. Since a subroutine indicates how forces should be applied depending on the position and other parameters of user object 34, the processor can issue low-level force commands, freeing the host computer to process the host application and determine only when a new type of force needs to be output. This greatly improves communication rates between host computer 12 and interface device 14.

In addition, the host computer 12 preferably has the ability to override the reflex operation of microprocessor 26 and provide calculated or other force values as described above with reference to FIG. 4. For example, the high level command can simply indicate a force value to be sent to an actuator 30. This override mode can also be implemented as a subroutine. For example, the microprocessor 26 can select a subroutine that instructs it to relay low-level force commands received from host computer 12 to an actuator 30.

Figure 6:
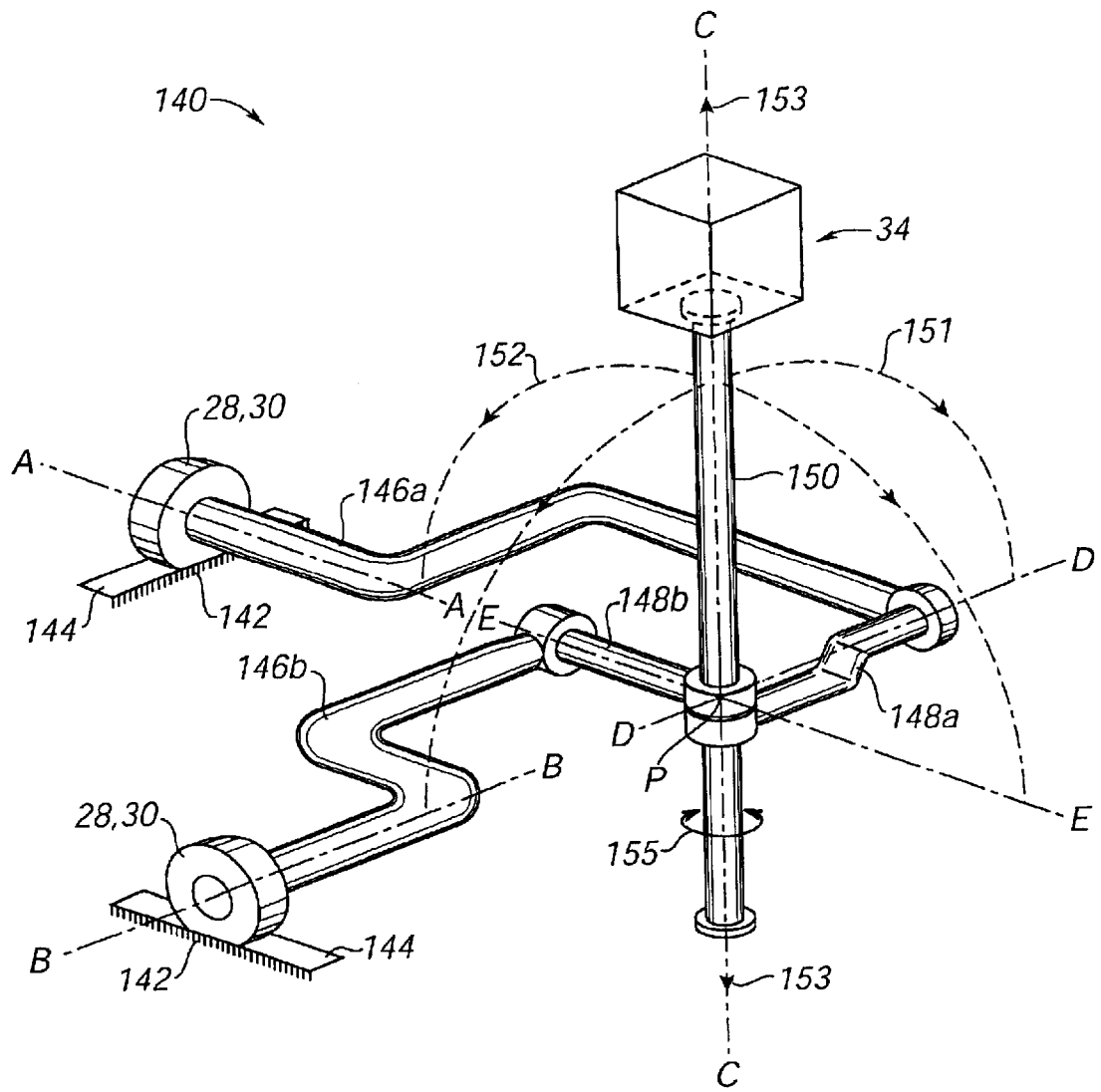
FIG. 6 is a schematic diagram of a closed loop five bar linkage mechanism for providing two degrees of freedom to the user object of the interface device.

FIG. 6 is a schematic diagram of an example of a user object 34 that is coupled to a gimbal mechanism 140 for providing two or more rotary degrees of freedom to object 34. Gimbal mechanism 140 can be coupled to interface device 14 or be provided with sensors 28 and actuators 30 separately from the other components of interface device 14. A gimbal device as shown in FIG. 6 is described in greater detail in co-pending patent applications Ser. Nos. 08/374,288 and 08/400,233, filed on Jan. 18, 1995 and Mar. 3, 1995, respectively, and hereby incorporated by reference herein.

Gimbal mechanism 140 can be supported by a grounded surface 142, which can be a surface of the housing of interface device 14, for example (schematically shown as part of member 144). Gimbal mechanism 140 is preferably a five-member linkage that includes a ground member 144, extension members 146a and 146b, and central members 148a and 148b. Ground member 144 is coupled to a base or surface which provides stability for mechanism 140. The members of gimbal mechanism 140 are rotatably coupled to one another through the use of bearings or pivots, wherein extension member 146a is rotatably coupled to ground member 144 and can rotate about an axis A, central member 148a is rotatably coupled to extension member 146a and can rotate about a floating axis D, extension member 146b is rotatably coupled to ground member 144 and can rotate about axis B, central member 148b is rotatably coupled to extension member 146b and can rotate about floating axis E, and central member 148a is rotatably coupled to central member 148b at a center point P at the intersection of axes D and E. The axes D and E are "floating" in the sense that they are not fixed in one position as are axes A and B. Axes A and B are substantially mutually perpendicular.

Gimbal mechanism 140 is formed as a five member closed chain. Each end of one member is coupled to the end of a another member. The five-member linkage is arranged such that extension member 146a, central member 148a, and central member 148b can be rotated about axis A in a first degree of freedom. The linkage is also arranged such that extension member 146b, central member 148b, and central member 148a can be rotated about axis B in a second degree of freedom.

Object 34 can be coupled to a linear axis member 150, or linear axis member 150 can be considered part of object 34. Linear member 150 is coupled to central member 148a and central member 148b at the point of intersection P of axes D and E. Linear axis member 150 is coupled to gimbal mechanism 140 such that it extends out of the plane defined by axis D and axis E. Linear axis member 150 can be rotated about axis A (and E) by rotating extension member 146a, central member 148a, and central member 148b in a first revolute degree of freedom, shown as arrow line 151. Member 150 can also be rotated about axis B (and D) by rotating extension member 50b and the two central members about axis B in a second revolute degree of freedom, shown by arrow line 152. In alternate embodiments, linear axis member is also translatably coupled to the ends of central members 148a and 148b, and thus can be linearly moved along floating axis C, providing a third degree of freedom as shown by arrows 153. Axis C can, of course, be rotated about one or both axes A and B as member 150 is rotated about these axes. In addition, linear axis member 150 in some embodiments can rotated about axis C, as indicated by arrow 155, to provide an additional degree of freedom. These additional degrees of freedom can also be provided with sensors and actuators to allow processor 26/host computer 12 to read the position of object 34 and apply forces in those degrees of freedom.

Sensors 28 and actuators 30 can be coupled to gimbal mechanism 140 at the link points between members of the apparatus and provide input to and output as described above. Sensors and actuators can be coupled to extension members 146a and 146b, for example.

User object 34 is coupled to mechanism 140. User object 44 may be moved in both (or all three) degrees of freedom provided by gimbal mechanism 140 and linear axis member 150. As object 34 is moved about axis A, floating axis D varies its position, and as object 34 is moved about axis B, floating axis E varies its position.

Figure 7:
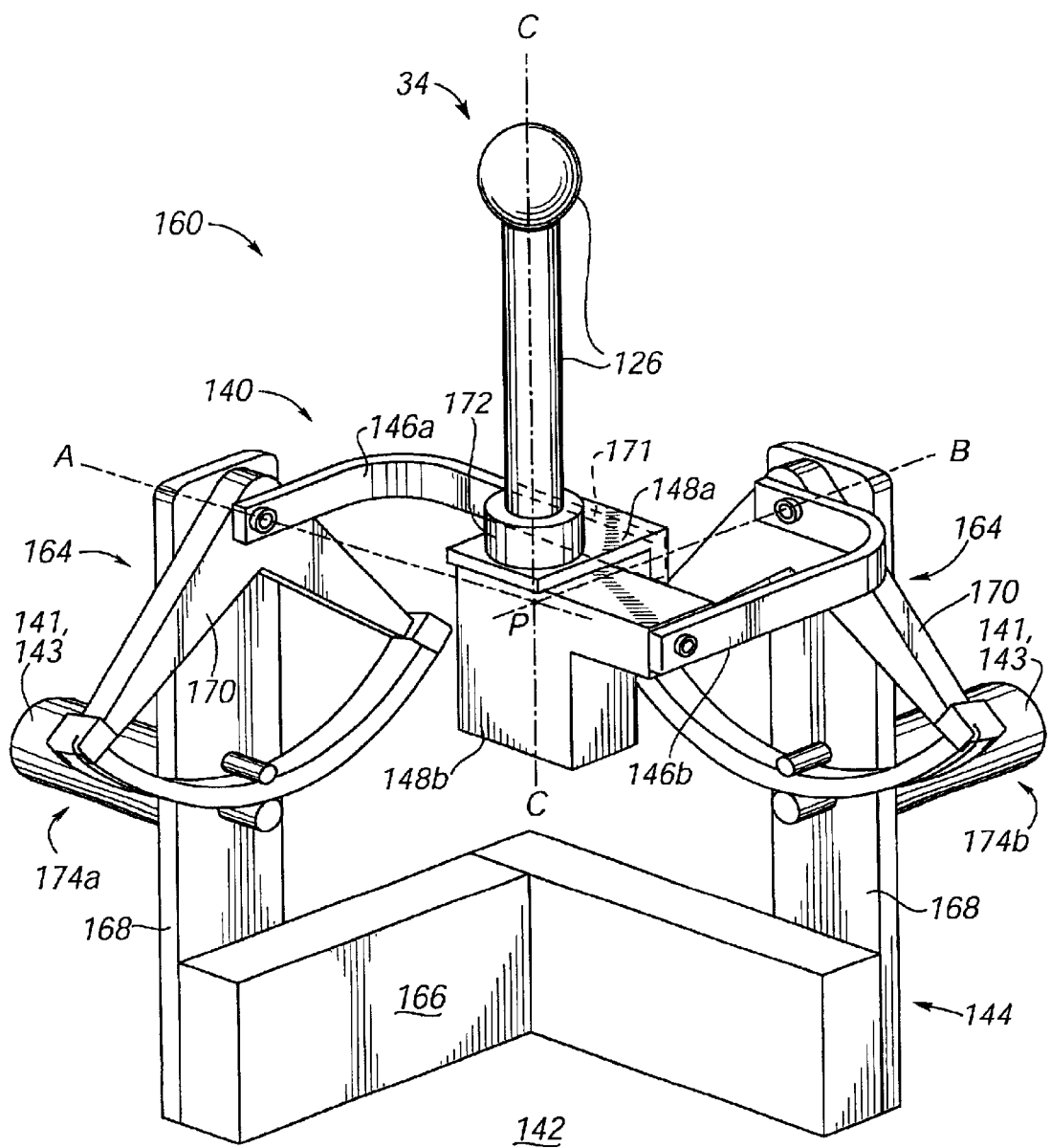
FIG. 7 is a perspective view of a preferred embodiment of the linkage mechanism shown in FIG. 6.

FIG. 7 is a perspective view of a specific embodiment of an apparatus 160 including gimbal mechanism 140 and other components of interface device 14 for providing mechanical input and output to host computer system 12. Apparatus 160 includes gimbal mechanism 140, sensors 141 and actuators 143. User object 34 is shown in this embodiment as a joystick having a grip portion 162 and is coupled to central member 148a. Apparatus 160 operates in substantially the same fashion as gimbal mechanism 140 described with reference to FIG. 6.

Gimbal mechanism 140 provides support for apparatus 160 on grounded surface 142, such as a table top or similar surface. The members and joints ("bearings") of gimbal mechanism 140 are preferably made of a lightweight, rigid, stiff metal, such as aluminum, but can also be made of other rigid materials such as other metals, plastic, etc. Gimbal mechanism 140 includes ground member 144, capstan drive mechanisms 164, extension members 146a and 146b, central drive member 148a, and central link member 148b. Ground member 144 includes a base member 166 and vertical support members 168. Base member 166 is coupled to grounded surface 142. A vertical support member 168 is coupled to each of these outer surfaces of base member 166 such that vertical members 168 are in substantially 90-degree relation with each other.

A capstan drive mechanism 164 is preferably coupled to each vertical member 168. Capstan drive mechanisms 164 are included in gimbal mechanism 140 to provide mechanical advantage without introducing friction and backlash to the system. The capstan drive mechanisms 164 are described in greater detail in co-pending patent application Ser. No. 08/400,233.

Extension member 146a is rigidly coupled to a capstan drum 170 and is rotated about axis A as capstan drum 170 is rotated. Likewise, extension member 146b is rigidly coupled to the other capstan drum 170 and can be rotated about axis B. Central drive member 148a is rotatably coupled to extension member 146a, and central link member 148b is rotatably coupled to an end of extension member 146b. Central drive member 148a and central link member 148b are rotatably coupled to each other at the center of rotation of the gimbal mechanism, which is the point of intersection P of axes A and B. Bearing 172 connects the two central members 148a and 148b together at the intersection point P.

Gimbal mechanism 140 provides two degrees of freedom to an object 34 positioned at or near to the center point P of rotation. An object at or coupled to point P can be rotated about axis A and B or have a combination of rotational movement about these axes. In alternate embodiments, object 34 can also be rotated or translated in other degrees of freedom, such as a linear degree of freedom along axis C or a rotary degree of freedom about axis C.

Sensors 141 and actuators 143 are preferably coupled to gimbal mechanism 140 to provide input and output signals between apparatus 160 and microprocessor 26. In the described embodiment, sensors 141 and actuators 143 are combined in the same housing as grounded transducers 174. Preferably, transducers 174a and 174b are bi-directional transducers having optical encoder sensors 141 and active DC servo motors 143. Passive actuators can also be used. The housing of each grounded transducer 174a is preferably coupled to a vertical support member 168 and preferably includes both an actuator 143 for providing force in or otherwise influencing the first revolute degree of freedom about axis A and a sensor 141 for measuring the position of object 34 in or otherwise influenced by the first degree of freedom about axis A. A rotational shaft of actuator 174a is coupled to a pulley of capstan drive mechanism 164 to transmit input and output along the first degree of freedom. Grounded transducer 174b preferably corresponds to grounded transducer 174a in function and operation. Transducer 174b is coupled to the other vertical support member 168 and is an actuator/sensor which influences or is influenced by the second revolute degree of freedom about axis B.

The transducers 174a and 174b of the described embodiment are advantageously positioned to provide a very low amount of inertia to the user handling object 34. Transducer 174a and transducer 174b are decoupled, meaning that the transducers are both directly coupled to ground member 144 which is coupled to ground surface 142, i.e. the ground surface carries the weight of the transducers, not the user handling object 34. The weights and inertia of the transducers 174a and 174b are thus substantially negligible to a user handling and moving object 34. This provides a more realistic interface to a virtual reality system, since the computer can control the transducers to provide substantially all of the forces felt by the user in these degrees of motion. Apparatus 160 is a high bandwidth force feedback system, meaning that high frequency signals can be used to control transducers 174 and these high frequency signals will be applied to the user object with high precision, accuracy, and dependability. The user feels very little compliance or "mushiness" when handling object 34 due to the high bandwidth. In contrast, in typical prior art arrangements of multi-degree of freedom interfaces, one actuator "rides" upon another actuator in a serial chain of links and actuators. This low bandwidth arrangement causes the user to feel the inertia of coupled actuators when manipulating an object.

Object 34 is shown in FIG. 3 as a joystick having a grip portion 126 for the user to grasp. A user can move the joystick about axes A and B. The movements in these two degrees of freedom are sensed by processor 26 and host computer system 12. Forces can be applied preferably in the two degrees of freedom to simulate various haptic sensations. Optionally, other objects 34 can be coupled to gimbal mechanism 140, as described above. For example, medical instruments, such as laparoscopic tools or catheters, can be used to simulate medical procedures. A laparoscopic tool sensor and force feedback device is described in U.S. patent application Ser. No. 08/275,120, filed Jul. 14, 1994 and entitled "Method and Apparatus for Providing Mechanical I/O for Computer Systems" assigned to the assignee of the present invention and incorporated herein by reference in its entirety.

Figure 8:
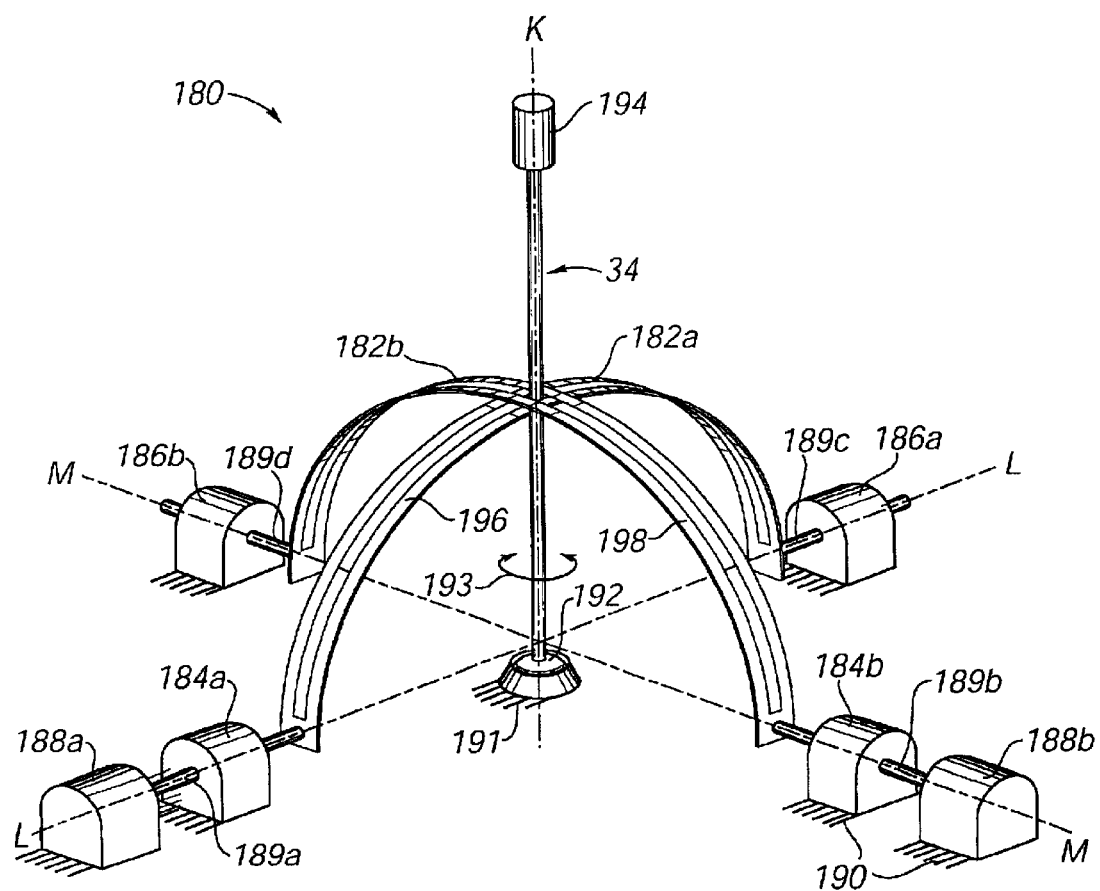
FIG. 8 is a perspective view of a slotted yoke joystick embodiment of the user object.

FIG. 8 is a perspective view of a different embodiment of object 34 and supporting mechanism 180 that can be used in conjunction with interface device 14. Mechanism 180 includes a slotted yoke configuration for use with joystick controllers that is well-known to those skilled in the art. Mechanism 180 includes slotted yoke 182a, slotted yoke 182b, sensors 184a and 184b, bearings 186a and 186b, actuators 188a and 188b, and joystick 34. Slotted yoke 182a, is rigidly coupled to shaft 189a that extends through and is rigidly coupled to sensor 184a at one end of the yoke. Slotted yoke 182a, is similarly coupled to shaft 189c and bearing 186a at the other end of the yoke. Slotted yoke 182a, is rotatable about axis L and this movement is detected by sensor 184a. Actuator 188a can be an active or passive actuator. In alternate embodiments, bearing 186a and be implemented as another sensor like sensor 184a.

Similarly, slotted yoke 182b is rigidly coupled to shaft 189b and sensor 184b at one end and shaft 189d and bearing 186b at the other end. Yoke 182b can rotated about axis M and this movement can be detected by sensor 184b.

Object 34 is a joystick that is pivotally attached to ground surface 190 at one end 192 so that the other end 194 typically can move in four 90-degree directions above surface 190 in two degrees of freedom (and additional directions in other embodiments). Joystick 34 extends through slots 196 and 198 in yokes 182a, and 182b, respectively. Thus, as joystick 34 is moved in any direction, yokes 182a, and 182b follow the joystick and rotate about axes L and M. Sensors 184a–d detect this rotation and can thus track the motion of joystick 34. Actuators 188*a* and 188*b* allow the user to experience force feedback when handling joystick 34. Alternatively, other types of objects 34 can be used in place of the joystick, or additional objects can be coupled to the joystick. In yet other embodiments, additional degrees of freedom can be provided to joystick 34. For example, the joystick can be provided with a rotary degree of freedom about axis K, as indicated by arrow 193. Sensors and/or actuators can also be included for such additional degrees of freedom.

In alternate embodiments, actuators can be coupled to shafts 189*c* and 189*d* to provide additional force to joystick 34. Actuator 188*a* and an actuator coupled to shaft 189*c* can be controlled simultaneously by microprocessor 26 or host computer 12 to apply or release force from bail 182*a*. Similarly, actuator 188*b* and an actuator coupled to shaft 189*d* can be controlled simultaneously.

FIG. 9 is a schematic illustration of another embodiment of object 34 and a transducer system 200 for sensing a rotary degree of freedom of object 34. Transducer system 200 preferably includes a passive actuator that provides a damping resistance to the motion of the object, and provides an amount of "play" to determine if object 34 is moved when maximum damping resistance is applied. Transducer system 200 is applied to a mechanism having one degree of freedom, as shown by arrows 212. System 200 can also be applied to systems having additional degrees of freedom. The transducer system 200 of FIG. 9 can be used in a wide variety of embodiments, including the embodiments of FIGS. 6, 7, and 8 disclosed herein. Transducer system 200 includes an actuator 202, an actuator shaft 204, a coupling 206, a coupling shaft 208, a sensor 210, and object 34.

Actuator 202 transmits a force to object 34 and is preferably grounded. Actuator 202 is rigidly coupled to an actuator shaft 204 which extends from actuator 202 to non-rigidly attached coupling 206. Actuator 202 is preferably a passive actuator and provides rotational resistive forces, shown by arrows 212, on actuator shaft 204. In some embodiments, passive actuators can provide several advantages over active actuators. For example, a substantially lower current is required to drive passive actuators than active actuators. This allows a less expensive power supply to drive a passive actuator system, and also allows a force feedback mechanism to be smaller and more lightweight due to the smaller power supply. In addition, passive actuators require substantially slower control signals to operate effectively and with stability in a simulation environment than do active actuators such as motors. This is significant if the interface is a low-speed input/output port, such as a serial bus. In addition, passive actuators do not generate forces on the interface and the user and are thus more safe for the user. A user will not experience unexpected and possibly injurious forces from the object 34, since the user is inputting all the energy into the system and providing all the active forces.

Coupling 206 is coupled to actuator shaft 204. Actuator 202, actuator shaft 204, and coupling 206 can be considered to be an "actuator assembly" or, in a passive actuating system, a "braking mechanism." Coupling 206 is loosely coupled to actuator shaft 204 and thus allows an amount (magnitude) of "play" between actuator shaft 204 and coupling 206. The term "play," as used herein, refers to an amount of free movement or "looseness" between a transducer and the object transduced, so that, for instance, the object can be moved a short distance by externally-applied forces without being affected by forces applied to the object by an actuator. In the preferred embodiment, the user can move the object a short distance without fighting the drag induced by a passive actuator such as a brake. For example, actuator 202 can apply a resistive or frictional force to actuator shaft 204 so that actuator shaft 204 is locked in place, even when force is applied to the shaft. Coupling 206, however, can still be freely rotated by an additional distance in either rotational direction due to the play between coupling 206 and shaft 204. This "desired" amount play is intentional for purposes that will be described below. Once coupling 206 is rotated to the limit of the allowed play, it either forces shaft 204 to rotate with it further; or, if actuator 202 is holding (i.e., locking) shaft 204, the coupling cannot be further rotated in that rotational direction. The amount of desired play between actuator 202 and object 34 depends on the resolution of sensor 210, as described below.

Examples of types of play include rotary backlash, such as occurs in gear systems and which is described below, and compliance or torsion flex, which can occur with flexible, rotational and non-rotational members. Transducer system 200 as shown in FIG. 9 uses rotary backlash to provide play between actuator 202 and coupling 206. Keyed actuator shaft 204 is keyed, is rigidly coupled to actuator 202, and mates with keyed coupling 206. The cross-sectional diameter of keyed actuator shaft 204 is preferably smaller than bore 218 of coupling 206, to provide the desired backlash, as described in greater detail with reference to FIG. 9*a*. In alternate embodiments, backlash can be provided between actuator 202 and coupling 206 using different components, such as gears, pulleys, etc.

Coupling shaft 208 is rigidly coupled to coupling 206 and extends to sensor 210. Sensor 210 is preferably rigidly coupled to coupling shaft 208 so as to detect rotational movement of shaft 208 and object 34 about axis N. Sensor 210 preferably provides a electrical signal indicating the rotational position of shaft 208 and is preferably grounded as indicated by symbol 211. In alternate embodiments, sensor 210 can be separated from object 34, coupling shaft 208, and coupling 206 and sense the movement of object 34, for example, by emitting and detecting electromagnetic energy or magnetic forces. The operation of such sensors are well-known to those skilled in the art.

Sensor 210 has a sensing resolution, which is the smallest change in rotational position of coupling shaft 208 that the sensor can detect. For example, an optical encoder may be able to detect on the order of about 3600 equally-spaced "pulses" (described below) per revolution of shaft 208, which is about 10 detected pulses per degree of rotational movement. Thus, the sensing resolution of this sensor is about $\frac{1}{10}$ degree in this example. Since it is desired to detect the desired play between actuator 202 and object 34 (as described below), this desired play should not be less than the sensing resolution of sensor 210 (e.g., $\frac{1}{10}$ degree). Preferably, the desired play between actuator and object would be at least $\frac{1}{5}$ degree in this example, since the encoder could then detect at least two pulses of movement, which would provide a more reliable measurement and allow the direction of the movement to be more easily determined.

Sensor 210 should also be as rigidly coupled to shaft 208 as possible so that the sensor can detect the desired play of shaft 208 and object 34. Any play between sensor 210 and object 34 should be minimized so that such play does not adversely affect the sensor's measurements. Typically, any inherent play between sensor 210 and object 34 should be less than the sensing resolution of the sensor, and preferably at least an order of magnitude less than the sensing resolution. Thus, in the example above, the play between sensor and object should be less than $\frac{1}{10}$ degree and preferably less than $\frac{1}{100}$ degree. Use of steel or other rigid materials for shaft 208 and other components, which is preferred, can allow the play between sensor 210 and object 34 to be made practically negligible for purposes of the present invention. As referred to herein, a sensor that is "rigidly" coupled to a member has a play less than the sensing resolution of the sensor (preferably a negligible amount).

Object 34 is rigidly coupled to coupling shaft 208. Object 34 can take a variety of forms, as described in previous embodiments, and can be directly coupled to coupling shaft 208 or can be coupled through other intermediate members to shaft 208. In FIG. 9, object 34 is coupled to shaft 208 between coupling 206 and sensor 210. Thus, as object 34 is rotated about axis N, shaft 208 is also rotated about axis N and sensor 210 detects the magnitude and direction of the rotation of object 34. Alternatively, object 34 can be coupled directly to coupling 206. Coupling 206 and/or shafts 204 and 208 can be considered a "play mechanism" for providing the desired play between actuator 202 and object 34. Alternatively, sensor 210 can be positioned between coupling 206 and object 34 on coupling shaft 208. Shaft 208 extends through sensor 210 and can be rigidly coupled to object 34 at the end of the shaft.

Applicant's introduced ("desired") play between object 34 and actuator 202 allows the joystick or other connected object to be moved slightly in one opposite direction even when the actuators are applying maximum resistance to the joystick. The sensor, being rigidly attached to the joystick, is not locked by the actuator and detects the change in direction. The sensor relays the movement to the computer, which deactivates the actuators to allow the joystick to be moved freely in the opposite direction. Thus the play mechanism allows "unidirectional" resistance to be simulated on the user object, as described below with respect to FIG. 12. Active actuators, such as the DC motors described above, can also be used with transducer system 200. Many active actuators, however, can apply force in one selected direction in a degree of freedom, so that the deliberately-introduced play would not be necessary when using such actuators.

In alternate embodiments, linear play can be implemented instead of rotary play. Compliance or backlash can be implemented between linearly moving (i.e., translatable) components. For example, a small amount of space can be provided between interlocked translatable components to provide play in accordance with the present invention. Linear actuators and sensors for transducing linear movement are well-known to those skilled in the art.

Other devices or mechanisms besides the use of play can be used in other embodiments to detect the direction of motion of object 34 while passive actuators are holding the object in place. For example, force sensors can be coupled to the object to measure the force applied to the object by the user along desired degrees of freedom. Since a force sensor can detect the direction of a user's force on an object, the deliberately-introduced play of the present embodiment is thus not required. However, such force sensors can be expensive and bulky, adding to the cost and size of the interface mechanism.

FIG. 9a is a side sectional view of actuator shaft 204 and coupling 206 taken along line 10a–10a of FIG. 9. Rotary backlash is used to provide play between actuator 202 and coupling 206. Actuator shaft 204 is keyed and is rigidly coupled to actuator 202. Keyed shaft 204 mates with keyed coupling 206. The cross-sectional diameter of keyed actuator shaft 204 is preferably smaller than bore 220 of coupling 206, to provide the desired backlash. Keyed shaft 204 extends into keyed bore 220 of coupling 206. In FIG. 9a, gap 222 is provided around the entire perimeter of shaft 204. In alternate embodiments, gap 222 can be provided only between the sides of the keyed portion 224 of shaft 204, as described with reference to FIG. 9c.

FIG. 9b is a side sectional view of keyed actuator shaft 204 and coupling 206 taken along line 9b—9b of FIG. 9a. Keyed shaft 204 is shown partially extending into coupling 206. As shown in FIG. 10a, small gap 222 is preferably provided between coupling 206 and shaft 204. When shaft 204 is rotated, coupling 206 is also rotated after the keyed portion of shaft 204 engages the keyed portion of bore 220, as described with reference to FIG. 9c. Main shaft 208 rotates as coupling 206 rotates, since it is rigidly attached.

FIG. 9c is a detailed view of FIG. 9a showing the keyed portions of shaft 204 and bore 220. Extended keyed portion 224 of shaft 204 protrudes into receiving keyed portion 226 of bore 220. In alternate embodiments, an extended keyed portion of coupling 206 can protrude into a receiving keyed portion of shaft 204. Gap 222 has a width d which determines how much desired backlash (play) is introduced between actuator 202 and object 34. (Additional unintentional backlash or other inherent play can also exist between the components of the system due to compliance of the shafts, etc.) In the described embodiment, in which sensor 210 has a sensing resolution of about $\frac{1}{10}$ degree, d is preferably about $\frac{1}{1000}$ inch. Note that the distance d can widely vary in alternate embodiments. The chosen distance d is preferably made small enough to prevent the user from feeling the backlash that exists in the system when handling object 34 and yet is large enough for the sensor to detect the play (i.e., greater than the sensing resolution of sensor 210) to allow the sensor to inform the computer the direction that the user is moving object 34. Thus, the distance d is highly dependent on the sensing resolution of sensor 210. For example, if a sensing resolution of $\frac{1}{100}$ degree is available, the distance d can be much smaller. The amount of backlash that a user can typically feel can depend on the size and shape of object 34; however, the backlash described above is not detectable by a user for the majority of objects. In other embodiments, it may be desirable to allow the user to feel the backlash or other play in the system, and thus a greater distance d can be implemented.

In the preferred embodiment, distance d allows rotational movement of coupling 206 at least equal to the sensing resolution of sensor 210 in either direction, thus allowing a total backlash of distance of $2d$ between surfaces 228 and 230 of coupling 206. Alternatively, a total backlash of distance d between surfaces 228 and 230 can be implemented (half of the shown distance). In such an embodiment, however, sensor 210 would only be able to detect movement from one limit of the backlash to the other limit, and, for example, movement of coupling 206 from a center position (as shown in FIG. 9c) would not be detected.

In the described embodiment, digital encoder sensors 210 are used, in which rotational movement is detected using a number of divisions on a wheel that are rotated past fixed sensors, as is well known to those skilled in the art. Each division causes a "pulse,", and the pulses are counted to determine the amount (magnitude) of movement. Distance d can be made as large or larger than the sensing resolution of the encoder so that the magnitude and direction of the movement within gap 222 can be detected. Alternatively, the resolution of the sensor can be made great enough (i.e., the distance between divisions should be small enough, in a digital encoder) to detect movement within gap 222. For example, two or more pulses should be able to be detected within distance d to determine the direction of movement of object 34 and coupling 206 using a digital encoder or the like.

When coupling 206 is initially rotated from the position shown in FIG. 9c in a direction indicated by arrow 232 (counterclockwise in FIG. 9a) as the user moves object 34 the coupling freely rotates. Coupling 206 can no longer be rotated when the inner surface 228 of keyed portion 226 engages surface 234 of keyed portion 224. Thereafter, external force (such as from the user) in the same direction will cause either both coupling 206 and shaft 204 to rotate in the same direction, or the external force will be prevented if actuator 202 is locking shaft 204 in place with high resistive force to prevent any rotational movement of shaft 204.

If the user moves object 34 in the opposite rotational direction after surface 228 has engaged surface 234, coupling 206 can again be rotated freely within gap 222 until surface 230 of bore 220 engages surface 236 of shaft 204, at which point both shaft and coupling are rotated (or no rotation is allowed, as described above). It is the magnitude and direction of the movement between the engagement of the surfaces of keyed portions 224 and 226 which can be detected by sensor 210, since sensor 210 is rigidly coupled to coupling 206. Sensor 210 can relay the direction which coupling 206/object 34 is moving to the controlling computer, and the computer can deactivate or activate actuator 202 accordingly. Even if object 34 is held in place by actuator 202, as when moving into a virtual obstruction, the computer can detect the backlash movement of object 34 if the user changes the direction of the object and can remove the damper resistance accordingly. It should be noted that host computer 12/processor 26 should preferably deactivate the actuator before surface 230 engages surface 236 so that the user will not feel any resistance to movement in the opposite direction.

Instead of implementing play as rotary backlash, as described above, torsion flex or compliance can be provided in the shafts to provide the desired amount of play. A flexible coupling 206 can take many possible forms, as is well known to those skilled in the art. The flexible coupling can allow coupling shaft 208 to rotate independently of actuator shaft 204 for a small distance, then force actuator shaft 204 to rotate in the same direction as coupling shaft 208. Compliance or flex can be provided with spring members and the like.

Figure 10:
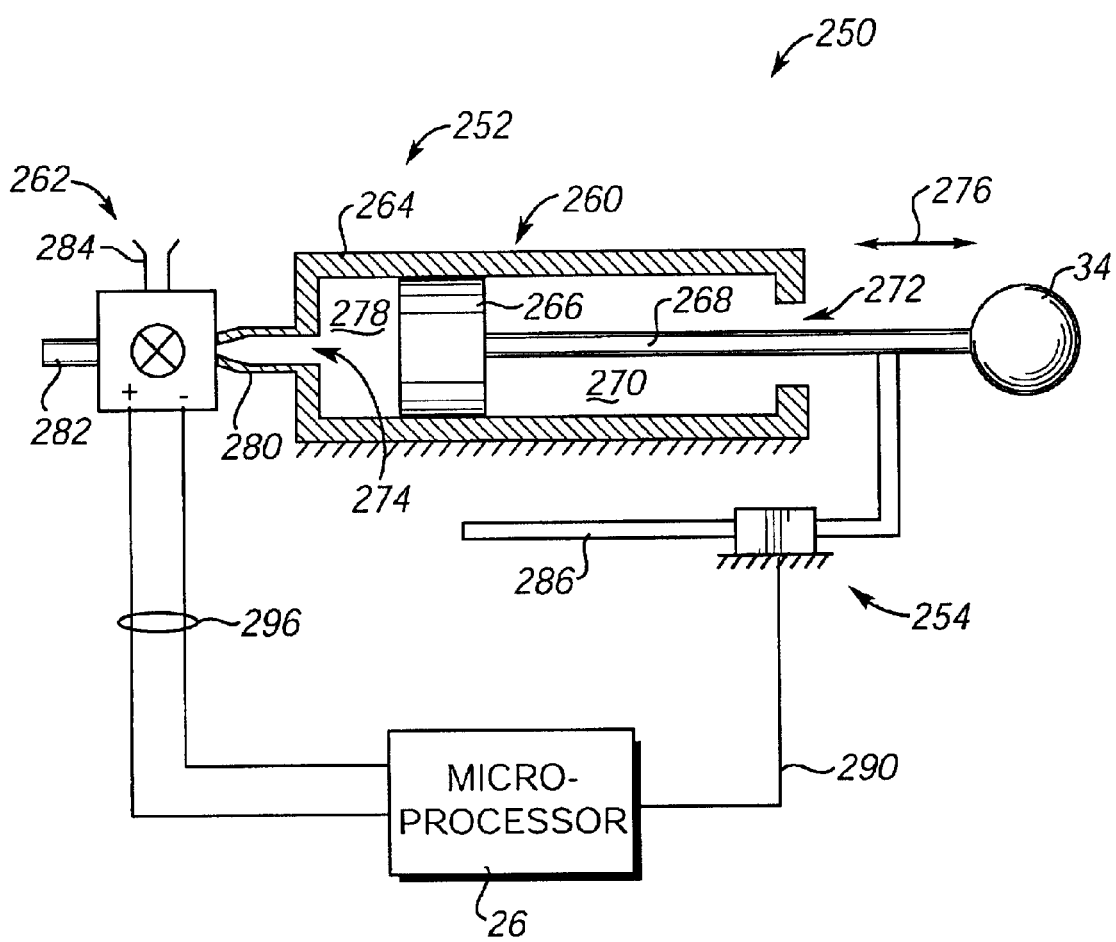
FIG. 10 is a schematic view of another embodiment of a transducer system for providing passive fluid controlled force feedback to the user object in a linear degree of freedom.

In FIG. 10, a schematic diagram of another embodiment of a transducer system 250 for providing passive force feedback is shown which can be used with interface device 14. Transducer system 250 includes a damper assembly 252 and a sensor 254. User object 34 is preferably coupled to damper assembly 252 and sensor 254 to allow the user to interface with microprocessor 26 and/or host computer 12. Herein, "damper" refers to a passive resistance mechanism that provides a damping resistance to motion of an object coupled to the mechanism.

Damper assembly 252 is coupled to object 34 to provide a passive damping resistance to the movement of object 34. The user generates a force on object 34 to cause the object to move in one or more provided degrees of freedom. In the embodiment of FIG. 10, a single linear degree of freedom is provided for object 34. A damping resistance generated by damper assembly 252 dampens or resists the motion of object 34 in that degree of freedom. In the described embodiment, object 34 is a handle, such as a control handle on a joystick.

Damper assembly 252 is a "fluid-resistance" device which provides a damping resistance based on the regulation of fluid flow within the device. In the preferred embodiment, the fluid is a gas, such as air, and thus is pneumatic. In alternate embodiments, hydraulic passive dampers can be used to provide resistance based on the regulation of liquid flow. Damper assembly 252 preferably includes a piston assembly 260 and a valve 262. Piston assembly 260 includes a housing or cylinder 264, a piston 266, and a piston rod 268. Cylinder 264 is an elongated structure having a hollow interior 270, a rod opening 272 positioned at one end, and a valve orifice 274 positioned at the opposite end.

Piston 266 is positioned within the interior of cylinder 264 and is constrained to be moved along the degree of freedom designated by axis 276. Piston 266 has a cross sectional shape equivalent to cylinder 264 so that a minimum gap between its outer edge and the inner edge of the interior 270 exists and no substantial amount of fluid may escape between the gap. Implementing a moving piston within a cylinder is well known to those skilled in the art. Piston assemblies or similar dapshot devices available from several manufacturers can be used in the present invention. For example, a suitable pneumatic device is the Precision Air Dapshot available from Airpot of Norwalk, Conn. Piston rod 268 couples piston 266 to user object 274.

The motion of piston 266 is dependent on the flow of a fluid 278 through valve orifice 274 in cylinder 264. As stated above, fluid 278 is preferably a gas such as air, but can be a liquid in other embodiments. As is well known to those skilled in the art, a piston may move when valve orifice 274 is unrestricted, which allows the fluid to flow through the orifice. For example, if the fluid is air in a pneumatic system, then the piston 266 can move toward orifice 274 if the piston is allowed to force air from the portion of interior 270 in "front" of the piston, through orifice 274, and to the atmosphere outside cylinder 264. Similarly, piston 266 can move toward opening 272 if air is allowed to flow from the atmosphere into the "front" portion of interior 270 of the cylinder. Some movement of piston 266 is typically possible even when fluid flow is completely restricted due to the compressible nature of air and other fluids, and due to small fluid leakages in the system.

Fluid 278 is used in damper assembly to provide a damping resistance or drag to the motion of object 34. The motion of the object can be resisted by controlling the amount of fluid flow through orifice 274. In the described embodiment, the fluid flow through orifice 274 is controlled by valve 262. Valve 262 is coupled to a duct 280 of cylinder 264 which allows fluid 278 to flow from interior 270, through orifice 274, and into a passage in valve 262. As is well known to those skilled in the art, a valve can be controlled to vary the size of the valve's passage to provide a selectable amount of fluid flow through the valve. The valve shown in FIG. 10, for example, can be an "on-off valve" or "open-close valve" that provides two amounts of fluid flow through orifice 274. The first is no fluid flow (closed valve), in which the valve is selected to connect a closed port 282 to duct 280. This allows substantially no fluid to enter or leave the interior 270 and substantially stops the movement of piston 266 within cylinder 264 (as explained above, some movement is actually still allowed due to compressibility and leakage of fluids). This provides the maximum damping resistance to piston 266 and user object 34.

The second amount of fluid flow is full flow (open valve), in which valve 262 connects open port 284 to duct 280. Open port 284 allows fluid 278 to be vented to the atmosphere or otherwise flow freely. This provides the minimum damping resistance (e.g., "free movement") to piston 266 and user object 34 in the described embodiment. For example, if a gas such as air is being used as a fluid, then open port 284 can vent the gas to the atmosphere; damper assembly 252 would thus be an "open-loop" system. A suitable on-off valve suitable for use in the present invention is the Minimatic Valve available from Clippard of Cincinnati, Ohio. In other embodiments, a closed-loop system can be provided, wherein fluid 278 is cycled back into cylinder 264. Such an embodiment is more appropriate for liquid fluids 278.

The fluid flow through orifice 274 can thus be controlled by adjusting the size of orifice 274 or the size of a passage connected to orifice 274. Valve 262 is controlled to select one of multiple provided ports, where each port has an orifice of a different size. Multiple valves can also be provided in serial or in parallel to provide a greater variety of fluid flow through orifice 274.

In an alternate embodiment, a servo valve can be used to provide a desired fluid flow. Such a valve receives an analog voltage signal for incrementally controlling the size of the valve's passageway based on the analog voltage, thus allowing fluid flow to be controlled to a finer resolution than when using on-off valves. A suitable servo valve for use in the present invention is QBI available from Proportion Air of McCordsville, Ind.

Passive dampers, such as damper assembly 252, can provide realistic force feedback to a user operating interface device 14. As explained above, passive dampers/actuators 252 can be much less expensive, safer, and less complex than active actuators and allow interface device 14 to be smaller and more lightweight by requiring a smaller power supply. Also, in the active pneumatic and hydraulic devices of the prior art, a supply of pressurized air must be regulated to provide active forces, requiring more complex and expensive components and controllers. In addition, the fluid dampers of the present invention provide even greater advantages to a low-cost, safe force feedback interface than do other types of passive actuators. Since the resistance applied to the user object 34 is provided by the flow of a fluid, simple valves or other devices for controlling the size of orifices can be used to change the resistance felt by the user. Thus, solenoids and other low-power components to be used to control the valves instead of more complex components used in other passive actuators. Dampers allow real-time stable control of force feedback even for very slow electronics systems and input/output ports. In addition, piston assemblies are very low cost and safer compared to other passive actuators.

Sensor 254 is coupled to object 34 in the described embodiment and senses the position of the object in a degree of freedom. Sensor 254 in the embodiment of FIG. 10 senses the position of the object in the single provided degree of freedom. A sliding member 286 is coupled to piston rod 268 or to object 34 and moves through sensor 254, which in the embodiment of FIG. 10 can be a linear pot, linear digital encoder, LVDT, or similar device for sensing an object's position in a linear degree of freedom. For example, part 0243-0000 available from Transtek of Ellington, Conn. can be used. Sensor 254 is coupled to processor 26 by a bus 290, which carries sensor signals that are representative of the position of object 34 along the provided degree of freedom to processor 26.

Valve 262 is controlled by microprocessor 26/host computer 12. Processor 26 is coupled to valve 262 by bus 296 and provides electrical signals to the valve to control the valve. For example, when using the on-off valve described above, a solenoid can be coupled to the valve to cause the valve to open or close, as is well known to those skilled the art. An interface that provides the signals to a solenoid is described above with reference to FIG. 3. Alternately, processor 26 can provide an analog voltage signal to control a servo valve, as described above with reference to FIG. 3.

Additional mechanical apparatuses can be coupled between transducer system 250 and user object 34 to provide additional stability to the motion of object 34. Also, additional degrees of freedom can be provided to object 34, where each degree of freedom can include its own transducer system 250. Other variations of transducer system 250 are described in greater detail in co-pending parent patent application Ser. No. 08/489,068.

Figure 11A:
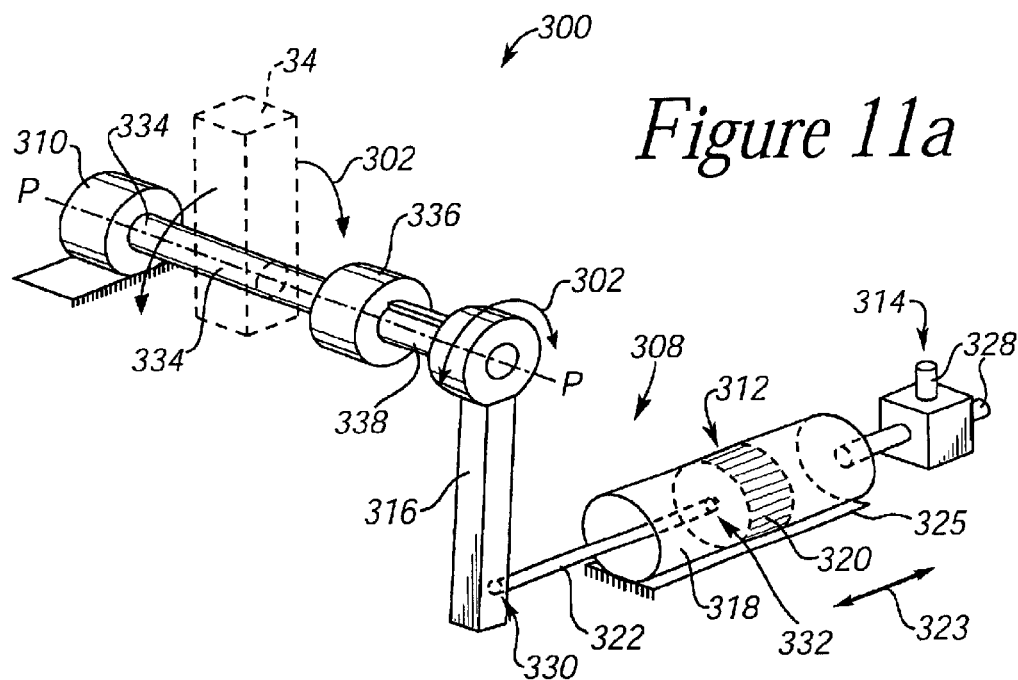
FIG. 11a is a schematic diagram of a transducer system of FIG. 10 that provides passive force feedback to the user object in a rotary degree of freedom.

FIG. 11*a* is a schematic illustration of another embodiment of object 34 and a transducer system 300 for sensing a rotary degree of freedom of object 34 using the dampers of FIG. 10. Transducer system 300 is applied to a mechanism having one rotary degree of freedom, as shown by arrows 302. System 300 can also be applied to systems having additional degrees of freedom. Transducer system 300 includes a passive damper assembly 308, a sensor 310, and an optional play mechanism 336.

Damper assembly 308 transmits a resistive force (i.e., drag) to an object 34 and includes a piston assembly 312, a valve 314, and a rotating member 316. Piston assembly 312 includes a cylinder 318, a piston 320, and a piston rod 322. Piston 320 moves along a linear degree of freedom within an interior of cylinder 318, as indicated by axis 323. Cylinder 318 is grounded, as shown by symbol 325. A fluid flows through an orifice 324 at the far end of cylinder 318 when piston 320 is moved within the cylinder. Valve 314 controls the fluid flow by selecting one of multiple ports 328, as described above. Valve 314 can thus regulate the fluid flow and thus the resistance to movement of piston 320. Damper assembly 308 can be implemented as described with reference to FIG. 10.

Rotating member 316 is coupled to piston 320 by piston rod 322. In the described embodiment, piston rod 322 is coupled to piston 320 by a ball joint 330 at one end of the piston rod. Similarly, piston rod 322 is coupled to rotating member 316 by another ball joint 332 at the other end of the piston rod. The ball joints 330 and 332 allows the piston rod to move at an angle with respect to the surfaces to which it is attached, thus permitting rotational movement of rotating member 316 to be converted into the linear movement of piston 320. Other types of connections can also be provided to rotatably connect the piston to the rotatable member, as is well known to those skilled in the art.

Rotating member 316 is rigidly coupled to a main shaft 334 which extends from rotating member 316 to sensor 310. Rotating member 316 and main shaft 334 can be rotated about an axis P. Damper assembly 308 provides a rotational damping resistance or frictional force (i.e. drag) on main shaft 334 in the provided rotary degree of freedom, shown by arrows 302. Sensor 310 is preferably rigidly coupled to shaft 334 and senses bi-directional rotary motion of main shaft 334 about axis P. Sensor 310 is preferably similar to sensor 110 described with reference to FIG. 9. Object 34 is rigidly coupled to main shaft 334.

In an alternate embodiment, a coupling or play mechanism 336 for introducing a desired amount of "play" can be included in transducer system 300, preferably positioned between the sensor 310 and the damper assembly 308. In this embodiment, main shaft 334 extends from sensor 310 to coupling 336, and a separate damper shaft 338 extends from coupling 336 to rotating member 316. Coupling 336 is rigidly coupled to main shaft 334 and non-rigidly coupled to damper shaft 338. Rotating member 316 is rigidly coupled to damper shaft 338.

Coupling 336 is not rigidly coupled to damper shaft 338 and thus allows an amount (magnitude) of play between damper shaft 338 and coupling 336, as described above with reference to FIG. 9. In some embodiments of the present invention, such desired play may not be necessary. For example, when using pneumatic piston assemblies, there is typically an amount of play that inherently exists due to air leakages in the piston cylinder and the compressibility of air.

Figure 11B:
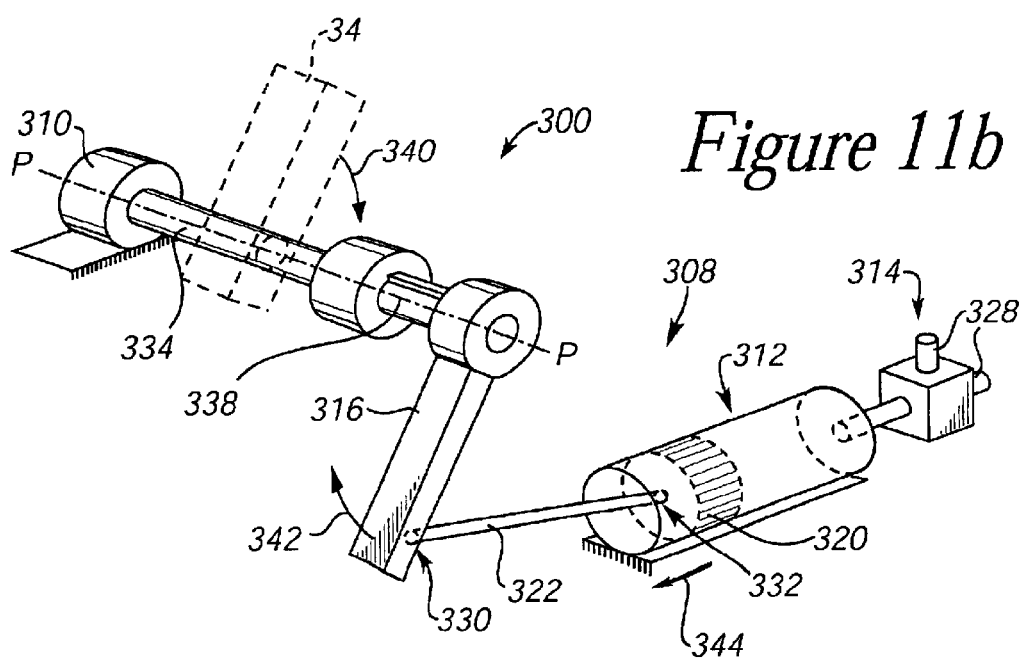
FIG. 11b is a schematic diagram of the transducer system of FIG. 11a where the object has been moved in the rotary degree of freedom.

FIG. 11b is a schematic diagram of transducer system 300. Object 34 has been moved by the user about axis P in the direction indicated by arrow 340. Accordingly, shaft 334 and thus rotating member 316 rotate in the same direction, as indicated by arrow 342. This causes piston 320 to move in the direction of arrow 344. As shown in FIG. 11b, ball joints 330 and 332 allow piston rod 322 to follow the rotational movement of rotating member 316 and cause the linear movement of piston 320 without any stress or bending of the piston rod.

In other embodiments, linear degrees of freedom can be provided as shown in FIG. 10. For example, two linear degrees of freedom can be provided to user object 34 by coupling damper assemblies 308 to rotary joints and coupling user object 34 to each of the rotary joints. Such an embodiment is described in greater detail in co-pending patent application Ser. No. 08/489,068. In other embodiments, the object's movement can be implemented using flexible members instead of joint members. Other objects 34 can also be used, such as a stylus receiving object including a divot for the user to place a stylus or similar article. The stylus can then be moved in the provided degrees of freedom. A finger receiving object 34 for similarly holding the user's finger or hand can also be used.

Figure 12:
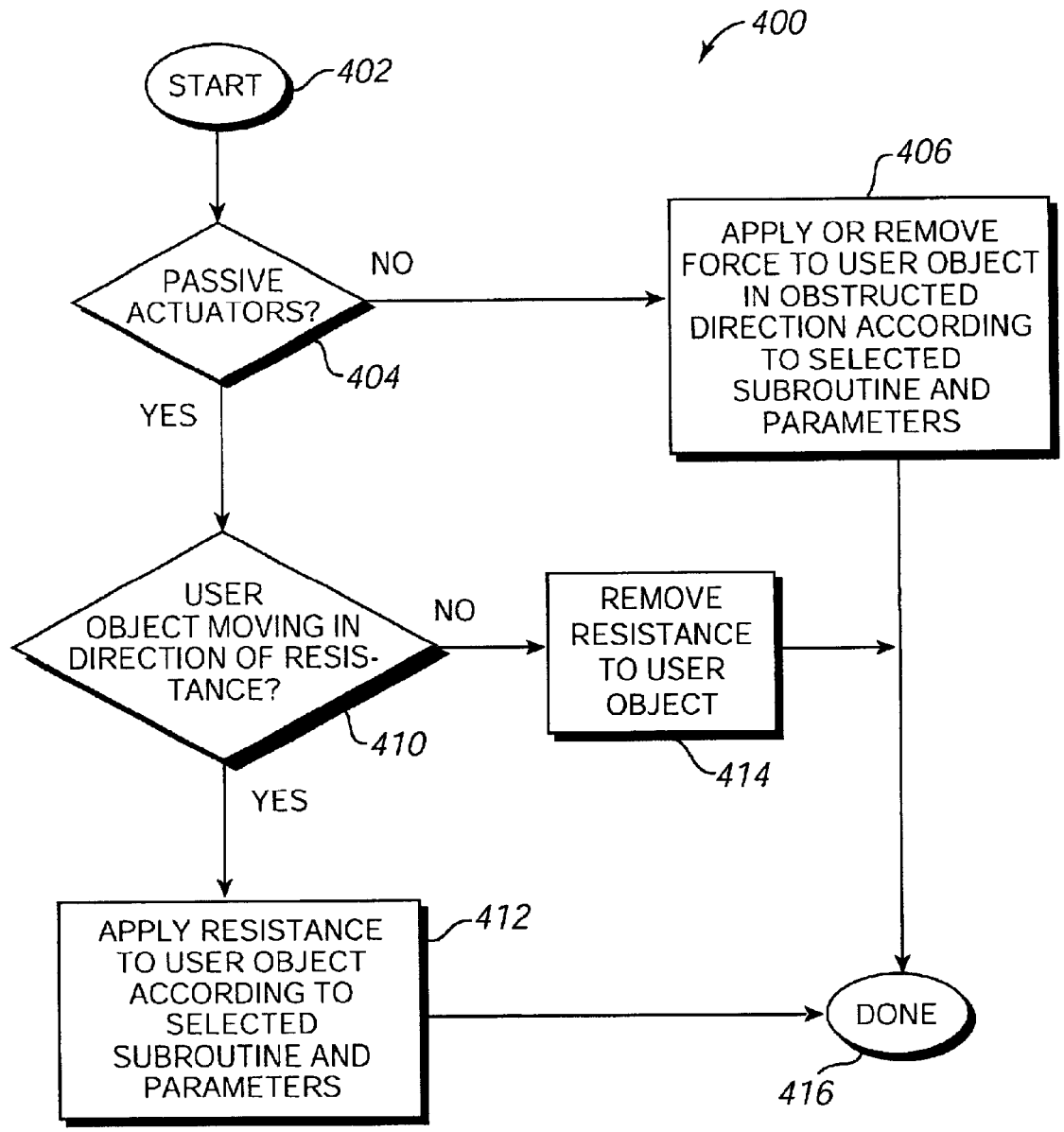
FIG. 12 is a flow diagram illustrating an example of implementing a process for providing forces on the user object to simulate a virtual obstruction.

FIG. 12 is a flow diagram illustrating an example method 400 of implementing a subroutine for providing forces on object 34 to simulate a virtual obstruction. This subroutine can be used in step 82 of FIG. 4 or in step 126 of FIG. 5. In this example, it is assumed that when the user moves object 34 in the direction of the obstruction, a force is applied to resist only the movement in the direction of the obstruction, i.e. a uni-directional force is applied to user object 34 is applied in only one specified direction along a degree of freedom (bi-directional damping resistance is applied to both directions along a degree of freedom so that the user would feel the same magnitude of resistance in either direction). The actual amount of force applied can depend on the type of obstruction; for example, if the obstruction is a brick wall, maximum force can be applied. If the obstruction is a "softer" surface, then a different amount of force can be applied. The uni-directional force can be determined by the host application implemented by host computer system 12. A uni- or bi-directional force indicator can be included in a high level host command to processor 26 in the embodiment of FIG. 5, and, if the force is uni-directional, the direction along the degree of freedom in which it is applied can also be included in the high level command.

The process begins at 402. In step 404, it is determined if passive or active actuators are being used (this fact may already be known to the host computer 12/processor 26). If passive actuators 30 are being used in interface device 14, then step 410 is implemented as described below. If active actuators are used, then step 406 is implemented, in which the desired amount of force is applied or removed to the user object in the obstructed direction as specified by the "soft-ness" of the obstruction, sensor data, and/or other parameters. For example, the amount of force can directly depend on the velocity of object 34 as it controls a virtual hammer to impact a virtual wall. Since active actuators can provide a force in a particular direction along a degree of freedom as desired, no additional steps need be taken. The process is thus complete at 416.

Passive actuators typically provide only bi-directional resistance (force) to motion of object 34 in response to control signals, and thus a uni-directional resistance is simulated in the following process. If the actuators are passive, then, after step 404, step 410 is implemented, in which host computer system 16 (in FIG. 4 embodiment) or local processor 26 (in FIG. 5 embodiment) checks whether the user object is being moved in the designated obstructed direction. Since the preferred dampers of the present invention provide resistance bi-directionally, a desired amount of "play" may be implemented to detect movement in the direction opposite to the direction of resistance, as explained above with reference to FIG. 9.

If the user is not moving in the direction of resistance, then the user object can be moved freely (in this example) and the process continues to step 414 to remove the resistance applied by passive actuators 30 (if any). The process is then complete at 416 (and continues to check if changes in force are required in FIGS. 4 and 5). If the user is moving in the direction of resistance in step 410, then step 412 is implemented, in which (bi-directional) resistance is applied to the user object. The amount of force applied is determined, as explained above, based on the selected subroutine, sensor data, timing data from clock 18, and/or other parameters. The process is then complete at 416 and continues appropriately in FIGS. 4 and 5 as described previously.

While this invention has been described in terms of several preferred embodiments, it is contemplated that alterations, modifications and permutations thereof will become apparent to those skilled in the art upon a reading of the specification and study of the drawings. For example, many possible types of actuators and sensors can be used in the present invention. Other active or passive actuators, such as motors, brakes, pneumatic or hydraulic devices can also be used to provide forces to a user object in accordance with the present invention. Also, many types of mechanisms can be included to provide one or more degrees of freedom to object 34. In addition, different types of interfaces can be used to connect the host computer to the local microprocessor. A wide variety and types of forces can be transmitted to a user object by the present invention. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. An apparatus, comprising:
    an object configured to be moved in at least one degree of freedom;
    a sensor configured to detect a position of said object in the at least one degree of freedom and configured to output a sensor signal, the sensor signal being associated with the position of said object in the at least one degree of freedom;
    a microprocessor coupled to said sensor, said microprocessor configured to send input data to a host computer, the input data being associated with the sensor signal and being usable by a host application program, the microprocessor further configured to select a low-level-force signal associated with a high-level-force command received from the host computer, the low-level-force signal including a force magnitude value; and an actuator coupled to the microprocessor and configured to output haptic feedback based on the selected low-level-force signal.

2. The device of claim 1, wherein the force magnitude value of the low-level force signal is associated with a time interval.

3. The device of claim 1, wherein the force magnitude value of the low-level force signal is pre-calculated and stored on the host computer prior to being received by the microprocessor.

4. The device of claim 1, wherein the low-level-force signal is received by the microprocessor based on a signal associated with a collision event being simulated on the host computer.

5. A processor-readable medium storing code representing instructions to cause a first processor to:

receive input data from a second processor coupled to an input device, the input data including position data;

generate a force command based on the position data received from the second processor; and transmit the force command to the second processor, the force command being one selected from a high-level-force command and a low-level-force command, the high-level-force command operative to cause the second processor to select a subroutine from a plurality of predefined subroutines based on the high-level-force command and output a force signal associated with the subroutine, the low-level-force command operative to cause the second processor to output a force signal associated with the low-level-force command.

6. The processor-readable medium of claim 5, wherein the selected subroutine is operative to instruct the processor to select a low-level-force command.

7. The processor-readable medium of claim 6, wherein the low-level-force command causes the processor to output a force signal to an actuator, the low-level-force command being based on sensor data received from a sensor coupled to the processor.

8. The processor-readable medium of claim 5, wherein the code further represents instructions to cause a first processor to:

receive and to selectively transmit via a Universal Serial Bus (USB) interface.

9. The processor-readable medium of claim 5, wherein the code further represents instructions to cause a first processor to:

store a force profile as at least one force magnitude value.

10. The computer-readable medium of claim 9, wherein the code further represents instructions to cause a first processor to:

select the stored force profile in response to the force command.

11. A method, comprising:

receiving input data from a processor coupled to an input device, the input data including position data based on a position of the input device;

generating a force command based on the position data received from the processor; and sending a force command to the processor, the force command including one of a high-level-force command and a low-level-force command, the high-level-force command operative to cause the processor to select a subroutine based on the high-level-force command and to output a force signal associated with the subroutine, the low-level-force command operative to cause the processor to output a force signal associated with the low-level-force command.

12. The method of claim 11, wherein the subroutine is operative to instruct the processor to select a low-level-force command.

13. The method of claim 12, wherein the low-level-force command causes the processor to output a force signal to an actuator, the low-level-force command being based on sensor data received from a sensor coupled to the processor.

14. The method of claim 11, wherein the receiving and the sending is performed over a Universal Serial Bus (USB) interface.

15. The method of claim 11, further comprising:

storing a force profile as at least one force magnitude value.

16. The method of claim 15, further comprising:

selecting the force profile based on the force command.

17. A method, comprising:

detecting a position of an object, the object configured to move in at least one degree of freedom;

outputting a sensor signal, the sensor signal being based on the position of the object in the at least one degree of freedom;

sending input data based on the sensor signal, the input data being operative to interact with a host application program;

receiving one of a high-level-force command and a low-level-force command including a force magnitude value;

selecting a force signal associated with the received one of the high-level-force command and the low-level-force command; and generating a haptic feedback signal associated with the selected force signal.

18. A method, comprising:

receiving input data from a processor coupled to an input device, the input data including position data based on a position of the input device;

generating a force command based on the position data received from the processor; and sending force commands to the processor, the force commands including one of a first force command and a second force command, the first force command operative to cause the processor to select a force output and to output a pre-determined force signal associated with the selected force output, the force signal being associated with a force magnitude included in the force output, the second force command operative to cause the processor to output a force signal associated with a force magnitude included in the second force command.

19. An apparatus, comprising:

an object configured to be moved in at least one degree of freedom;

a sensor configured to detect a position of said object in the at least one degree of freedom and configured to output a sensor signal, the sensor signal being associated with the position of said object in the at least one degree of freedom;

a microprocessor coupled to the sensor, said microprocessor configured to send input to a host computer, the input data being associated with the sensor signal and being usable by a host application program, the microprocessor further configured to select a low-level-force command associated with a high-level-force command received from the host computer, the microprocessor further configured to output a low-level-force signal associated with the low-level-force command, the low-level-force signal including a force magnitude value; and an actuator coupled to the microprocessor and configured to output haptic feedback based on the selected low-level-force signal.

* * * * *